United States Patent
Toujo

(10) Patent No.: US 8,525,618 B2
(45) Date of Patent: Sep. 3, 2013

(54) METAMATERIAL HAVING A NEGATIVE DIELECTRIC CONSTANT AND A NEGATIVE MAGNETIC PERMEABILITY

(75) Inventor: Atsushi Toujo, Nagaokakyo (JP)

(73) Assignee: Murata Manufacturing Co., Ltd., Nagaokakyo-Shi, Kyoto-Fu (JP)

( * ) Notice: Subject to any disclaimer, the term of this patent is extended or adjusted under 35 U.S.C. 154(b) by 171 days.

(21) Appl. No.: 13/032,874

(22) Filed: Feb. 23, 2011

(65) Prior Publication Data

US 2011/0163826 A1 Jul. 7, 2011

Related U.S. Application Data

(63) Continuation of application No. PCT/JP2009/064906, filed on Aug. 27, 2009.

(30) Foreign Application Priority Data

Sep. 3, 2008 (JP) ................................ 2008-225898
Mar. 2, 2009 (JP) ................................ 2009-048151

(51) Int. Cl.
  *H03H 7/00* (2006.01)
(52) U.S. Cl.
  USPC ........... 333/185; 333/176; 333/202; 333/204; 333/235
(58) Field of Classification Search
  USPC ................. 333/175, 185, 176, 202, 204, 219, 333/235
  See application file for complete search history.

(56) References Cited

U.S. PATENT DOCUMENTS

| | | | |
|---|---|---|---|
| 5,892,415 A * | 4/1999 | Okamura | 333/175 |
| 6,414,568 B1 * | 7/2002 | Matsumura et al. | 333/185 |
| 7,532,397 B2 | 5/2009 | Tanaka | |
| 7,538,946 B2 | 5/2009 | Smith | |

FOREIGN PATENT DOCUMENTS

| JP | 2006-350232 A | 12/2006 |
|---|---|---|
| JP | 2008-507733 T | 3/2008 |

OTHER PUBLICATIONS

PCT/JP2009/064906 Written Opinion dated Nov. 18, 2009.
Pendry et al. "Low Frequency Plasmons in thin wire structures" J. Phys. Condens. Matter vol. 10 (1998) pp. 4785-4809.
"Left-handed Metamaterial", Nikkei Electronics Jan. 2, Nikkei Business Publications. Inc. Jan. 2, 2006, pp. 75-81.

* cited by examiner

*Primary Examiner* — Robert Pascal
*Assistant Examiner* — Kimberly Glenn
(74) *Attorney, Agent, or Firm* — Dickstein Shapiro LLP

(57) ABSTRACT

A unit of a metamaterial includes an uppermost part electrode, a lowermost part electrode, a first internal electrode, a second internal electrode, a third internal electrode, a fourth internal electrode, and a transmission line. The transmission line connects a section of the uppermost part electrode which extends in the −z direction to a section of the lowermost part electrode which extends in the +z direction. The length of the transmission line is set to substantially ½ of a resonant wavelength. The first internal electrode and the fourth internal electrode are respectively placed so as to be opposed to the uppermost part electrode and the lowermost part electrode. The first internal electrode and the fourth internal electrode are not electrically connected directly to each other.

13 Claims, 22 Drawing Sheets

METAMATERIAL HAVING A NEGATIVE DIELECTRIC CONSTANT AND A NEGATIVE MAGNETIC PERMEABILITY

CROSS REFERENCE TO RELATED APPLICATIONS

The present application is a continuation of International Application No. PCT/JP2009/064906, filed Aug. 27, 2009, which claims priority to Japanese Patent Application No. JP2008-225898, filed Sep. 3, 2008, and Japanese Patent Application No. JP2009-048151, filed Mar. 2, 2009, the entire contents of each of these applications being incorporated herein by reference in their entirety.

FIELD OF THE INVENTION

The present invention relates to a metamaterial, and more particularly, relates to a left-handed metamaterial with a negative dielectric constant and a negative magnetic permeability.

BACKGROUND OF THE INVENTION

In recent years, devices referred to as metamaterials have been attracting attention. This metamaterial refers to an artificial substance which has electromagnetic and/or optical properties provided by none of substances in nature. Typical properties of this metamaterial include a negative magnetic permeability ($\mu<0$), a negative dielectric constant ($\in<0$), or a negative refractive index (when the magnetic permeability and the dielectric constant are both negative). It is to be noted that the region with $\mu<0$ and $\in>0$ or the region with $\mu>0$ and $\in<0$ is also referred to as a "evanescent solution region", whereas the region with $\mu<0$ and $\in<0$ is also referred to as a "left-handed region".

Left-handed metamaterials with $\mu<0$ and $\in<0$ are made by a periodic arrangement of an element with a negative dielectric constant and an element with a negative magnetic permeability, in order to develop a negative dielectric constant and a negative magnetic permeability at the same time.

Left-handed metamaterials are classified roughly into a circuit system and a resonance system. As a means for developing negative magnetic permeability $\mu$ in the resonance system, for example, a split ring resonator (SRR) has been known (for example, see Non-Patent Document 1).

On the other hand, as a means for developing negative dielectric constant $\in$, a metallic wire has been known which is sufficiently long with respect to the wavelength of an electromagnetic wave. This metallic wire decreases a plasma frequency to develop negative dielectric constant $\in$. Non-Patent Document 2 discloses the ability of an array of metallic wires to develop negative dielectric constant $\in$. In addition, Japanese Patent Application Laid-Open No. 2008-507733 (Patent Document 1) discloses a wire of a periodic lattice for a negative dielectric constant.

In addition, it has been also known that a metallic wire which has a length of half the wavelength λ of an electromagnetic wave generates a negative dielectric constant through a resonance with the electromagnetic wave.

Patent Document 1: Japanese Patent Application Laid-Open No. 2008-507733
Non-Patent document 1: "Left-handed Metamaterial", Nikkei Electronics January 2, Nikkei Business Publications, Inc., Jan. 2, 2006, PP. 75-81
Non-Patent document 2: J B Pendry et al., "Low Frequency Plasmons in thin-wire structures", J. Phys. Condens. Matter Vol. 10 (1998) 4785-4809

SUMMARY OF THE INVENTION

The method of using a metallic wire which is sufficiently long with respect to the wavelength of an electromagnetic wave in order to develop negative dielectric constant $\in$ fails to reduce the metallic wire in size. Therefore, it is conceivable to use a metallic wire which has a length of half the wavelength λ of an electromagnetic wave.

However, when a left-handed metamaterial is to be achieved by combining a metallic wire with a length of λ/2 with a resonator for developing negative magnetic permeability $\mu$, there is a possibility that the metallic wire with a length of λ/2 which is a type of resonator will interfere with the resonator for developing negative magnetic permeability $\mu$. Then, as a result, there is a possibility that the combination of the metallic wire with the resonator will not develop negative dielectric constant $\in$ and negative magnetic permeability $\mu$ at the same time.

The present invention has been achieved to solve the problem described above, and an object of the present invention is to provide a left-handed metamaterial using a metallic wire with a length of λ/2.

A metamaterial in accordance with an aspect of the present invention includes a first resonator that exhibits a negative dielectric constant with respect to an electromagnetic wave of a resonant wavelength, a second resonator that exhibits a negative magnetic permeability with respect to an electromagnetic wave of the resonant wavelength; and a supporting member for fixing positions of the first resonator and the second resonator. The first resonator includes a line which has a length of substantially ½ the resonant wavelength. The supporting member fixes the positions of the first resonator and the second resonator so that a magnetic field generated by a resonance of the second resonator is concentrated on a region which is different from a region on which an electric field generated by a resonance of the first resonator is concentrated.

Preferably, the supporting member fixes the positions of the first resonator and the second resonator so that both ends of the line are located outside the second resonator.

Preferably, the supporting member fixes the positions of the first resonator and the second resonator so that electric charges of the same polarity do not interfere with each other, the electric charges being generated by a resonance on each of the first resonator and the second resonator.

Preferably, the supporting member fixes the first resonator and the second resonator between a signal line through which an electric current flows and a ground.

Further preferably, the supporting member fixes the first resonator so that the distance of one end of the line from the signal line is different from the distance of the other end of the line from the signal line.

Further preferably, the second resonator includes an LC resonator, and wherein the supporting member fixes the position of the LC resonator so that a magnetic field generated by the electric current passes through a resonance loop of the LC resonator.

Further preferably, the supporting member fixes an end of the line at least one of between the second resonator and a plane including the signal line and between the second resonator and the ground.

More preferably, the second resonator includes a first outermost electrode and a second outermost electrode which is different in polarity from the first outermost electrode. The supporting member fixes one end of the line between the first outermost electrode and a plane including the signal line, and fixes the other end of the line between the second outermost electrode and the ground.

Further preferably, the supporting member fixes the first resonator so that electric potentials at either end of the line are different from each other, the electric potential being generated by the electric current.

Further preferably, the supporting member fixes the position of the second resonator so that the second resonator undergoes magnetic coupling with a magnetic field generated by the electric current.

More preferably, the second resonator includes a first electrode and a second electrode opposed to the first electrode. The supporting member fixes the first electrode and the second electrode substantially parallel to the direction of an electric field generated by the electric current.

A metamaterial in accordance with another aspect of the present invention includes a first resonator that exhibits a negative dielectric constant with respect to an electromagnetic wave of a resonant wavelength, a second resonator that exhibits a negative magnetic permeability with respect to an electromagnetic wave of the resonant wavelength, and a supporting member for fixing positions of the first resonator and the second resonator. The first resonator includes a line which has a length of substantially ½ the resonant wavelength. The second resonator includes a plurality of first plate-shaped electrodes and a plurality of second plate-shaped electrodes respectively opposed to the plurality of first plate-shaped electrodes. The plurality of first plate-shaped electrodes and the plurality of second plate-shaped electrodes are placed so that one of the first plate-shaped electrodes is located as a first outermost electrode located on one outermost part of the entire plate-shaped electrodes, whereas one of the second plate-shaped electrodes is located as a second outermost electrode located on the other outermost part. The second resonator further includes a first connection for electrically connecting the plurality of first plate-shaped electrodes and a second connection for electrically connecting the plurality of second plate-shaped electrodes. The supporting member fixes positions of the first resonator and the second resonator so that the first outermost electrode is close to one end of the line and the second outermost electrode is close to the other end of the line.

Preferably, the first resonator further includes a first conductive plate electrically connected to the one end and a second conductive plate electrically connected to the other end. The supporting member fixes the first conductive plate in a position outside the second resonator and opposed to the first outermost electrode, and fixes the second conductive plate in a position outside the second resonator and opposed to the second outermost electrode.

The metamaterial according to the present invention includes the first resonator that includes the line which has a length of substantially ½ the resonant wavelength and exhibits a negative dielectric constant at the resonant wavelength, and the second resonator that exhibits a negative magnetic permeability at the resonant wavelength. These resonators are placed so that a magnetic field generated by a resonance of the second resonator is concentrated on a region which is different from a region on which an electric field generated by a resonance of the first resonator is concentrated.

In addition, according to an aspect of the present invention, a capacitive resonator placed so that one outermost electrode is close to one end of a metallic wire of λ/2 in length whereas the other outermost electrode is close to the other end of the metallic wire is used to develop a negative magnetic permeability. In this case, a resonator in which electric charges accumulated on the two outermost electrodes have opposite signs to each other is used as the capacitive resonator. The configuration described above can achieve a metamaterial which uses a metallic wire of λ/2 in length and develops a negative dielectric constant and a negative magnetic permeability at the same time.

DETAILED DESCRIPTION OF THE INVENTION

[Resonators]

A left-handed metamaterial according to the present embodiment is directed to a resonance system of resonators combined. Thus, resonators will be described which constitute the left-handed metamaterial according to the present embodiment.

Multilayer Capacitive Resonator

One of resonators for use in the present embodiment is a multilayer capacitive resonator including a plurality of electrodes. This resonator has a resonant circuit formed mainly with a capacitance produced between the electrodes. This resonant circuit is sensitive to a specific frequency component of electromagnetic waves generated by an alternate current flowing through signal lines around the resonator, and can give rise to an electrical resonance phenomenon in response to electromagnetic waves of this frequency component. This resonance phenomenon develops a negative magnetic permeability.

In this case, in order to give rise to a magnetic permeability resonance which is a function as a metamaterial, the length of each resonator in the direction of electric current propagation needs to be at least $\lambda/4$ shorter than the wavelength $\lambda$ of the electromagnetic wave at a target frequency. Furthermore, the length of each resonator in the direction of electric current propagation is preferably $\lambda/20$ or less.

As the resonator, laminated capacitors, etc. can be used which are formed by stacking a plurality of plate electrodes with an insulator (dielectric) therebetween. The configuration of a resonator achieved with the use of a laminated capacitor will be given below as an example. In accordance with this configuration, commercial laminated capacitors such as laminated ceramic capacitors can be used to constitute resonators easily. However, electrode members may be used which are designed exclusively for constituting resonators according to the present embodiment.

Figure 1:
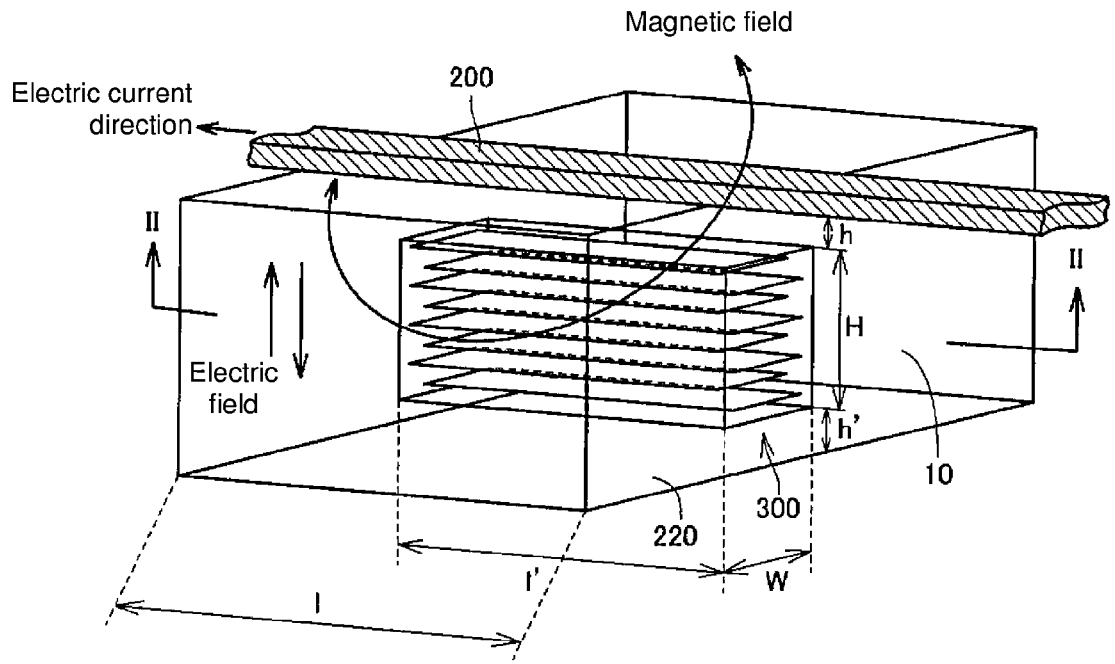
FIG. 1 is a schematic external view of a capacitive resonator.

FIG. 1 is a schematic external view of a capacitive resonator 300. Referring to FIG. 1, the capacitive resonator 300 is covered with an outer covering 10 which is a nonmagnetic body. It is to be noted that resin materials such as Teflon (registered trademark) are suitable as the outer covering 10. This capacitive resonator 300 is placed close to a signal line 200 through which an electric current including a predetermined frequency component flows, to give rise to a resonance in response to a specific frequency component (resonance frequency) of electromagnetic waves generated by the electric current. In addition, a ground 220 is set on the side opposite to the side in contact with the signal line 200 of the capacitive resonator 300.

The resonance in the capacitive resonator 300 generates a magnetic flux in the capacitive resonator 300 to develop a negative magnetic permeability.

Further, in order for the capacitive resonator 300 to develop a negative magnetic permeability, that is, produce a negative magnetic permeability which is a function as a metamaterial, the length l' of the capacitive resonator 300 along the direction of electric current propagation in the signal line 200 needs to be at least shorter than $\lambda/4$ with respect to the wavelength $\lambda$ of the electromagnetic wave at a resonance frequency. Furthermore, the length l of the capacitive resonator 300 is preferably $\lambda/20$ or less.

As an example of the capacitive resonator 300, case will be given below using a laminated capacitor including 8 layers of internal electrodes with a length l'=1.6 mm, a width W=0.8 mm, and a height H=0.8 mm. It is to be noted that the distance between the signal line 200 and the laminated capacitor is h=0.2 mm and the distance between the laminated capacitor and the ground 220 is h'=0.2 mm.

In this case, the condition of $\lambda/4$=length l'=1.6 mm results in $\lambda$=6.4 mm, which corresponds to a frequency fmax=46.875 GHz in air. Accordingly, when this capacitive resonator 300 is arranged at a pitch of $\lambda/4$ or less, the arrangement can be used as a metamaterial in the gigahertz band. It will be understood that the length l of the resonator can be appropriately designed depending on the frequency range to be applied.

Figure 2:
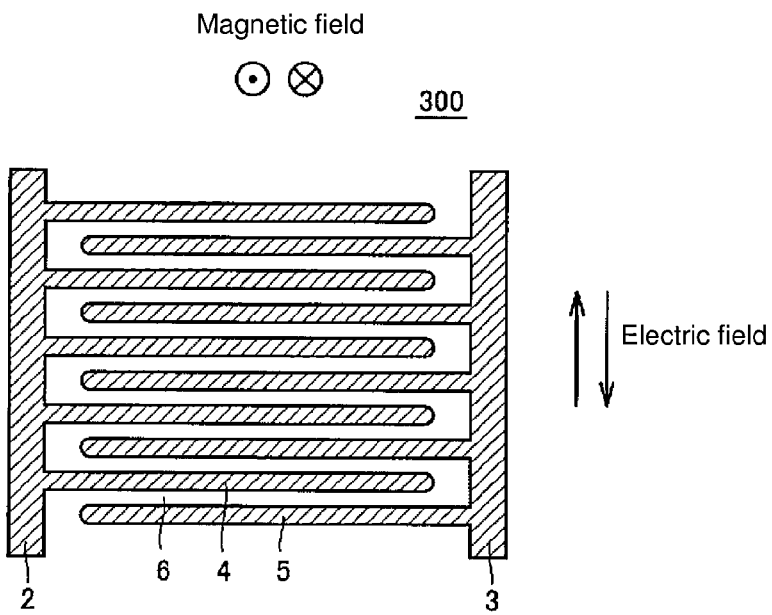
FIG. 2 is a cross-sectional view of FIG. 1 along the line II-II.

Next, the structure of the capacitive resonator 300 will be described with reference to FIGS. 1 and 2. FIG. 2 is a cross-sectional view of FIG. 1 along the line II-II.

Referring to FIG. 1, when an electric current flows through the signal line 200, an alternate-current magnetic field is generated in a circumferential direction with the signal line 200 as a center. More specifically, the line of magnetic force for the magnetic field is made in a concentric fashion with the signal line 200 as a center. In addition, the signal line 200 has an electric potential generated when the electric current flows, and an alternate-current electric field is thus generated between the signal line 200 and the ground 220.

Referring to FIG. 2, the capacitive resonator 300 includes multiple pairs of first internal electrodes 4 and second internal electrodes 5 with spacers 6 interposed therebetween which are insulators with a high dielectric constant. The multiple first internal electrodes 4 are electrically connected to a first external electrode 2, whereas the multiple second internal electrodes 5 are electrically connected to a second external electrode 3. As described above, the capacitive resonator 300 has the multiple plate-like internal electrodes 4 and 5 stacked, and a capacitance is generated between the adjacent first internal electrode 4 and second internal electrode 5, with the capacitance value determined by the areas of the electrodes, the distance between the electrodes, the relative dielectric constant of the spacer 6, etc.

The respective electrode planes of the first internal electrodes 4 and second internal electrodes 5 constituting the capacitive resonator 300 are arranged so as to be substantially parallel to the line of magnetic force for the magnetic field. Moreover, the respective electrode planes of the first external electrode 2 and second external electrode 3 are arranged so as to be substantially parallel to the line of magnetic force for the magnetic field in planes different from the respective electrode planes of the first external electrode 2 and second external electrode 3. More specifically, as shown in FIG. 2, when the line of magnetic force for the magnetic field generated by the electric current flowing through the signal line 200 is generated in a direction perpendicular to the plane of paper, the capacitive resonator 300 is placed so that the longitudinal direction of the electrode cross section is coincident with a horizontal direction parallel to the plane of paper for the first internal electrodes 4 and second internal electrodes 5 and the longitudinal direction of the electrode cross section is coincident with a vertical direction parallel to the plane of paper for the first external electrode 2 and second external electrode 3.

Figure 3:
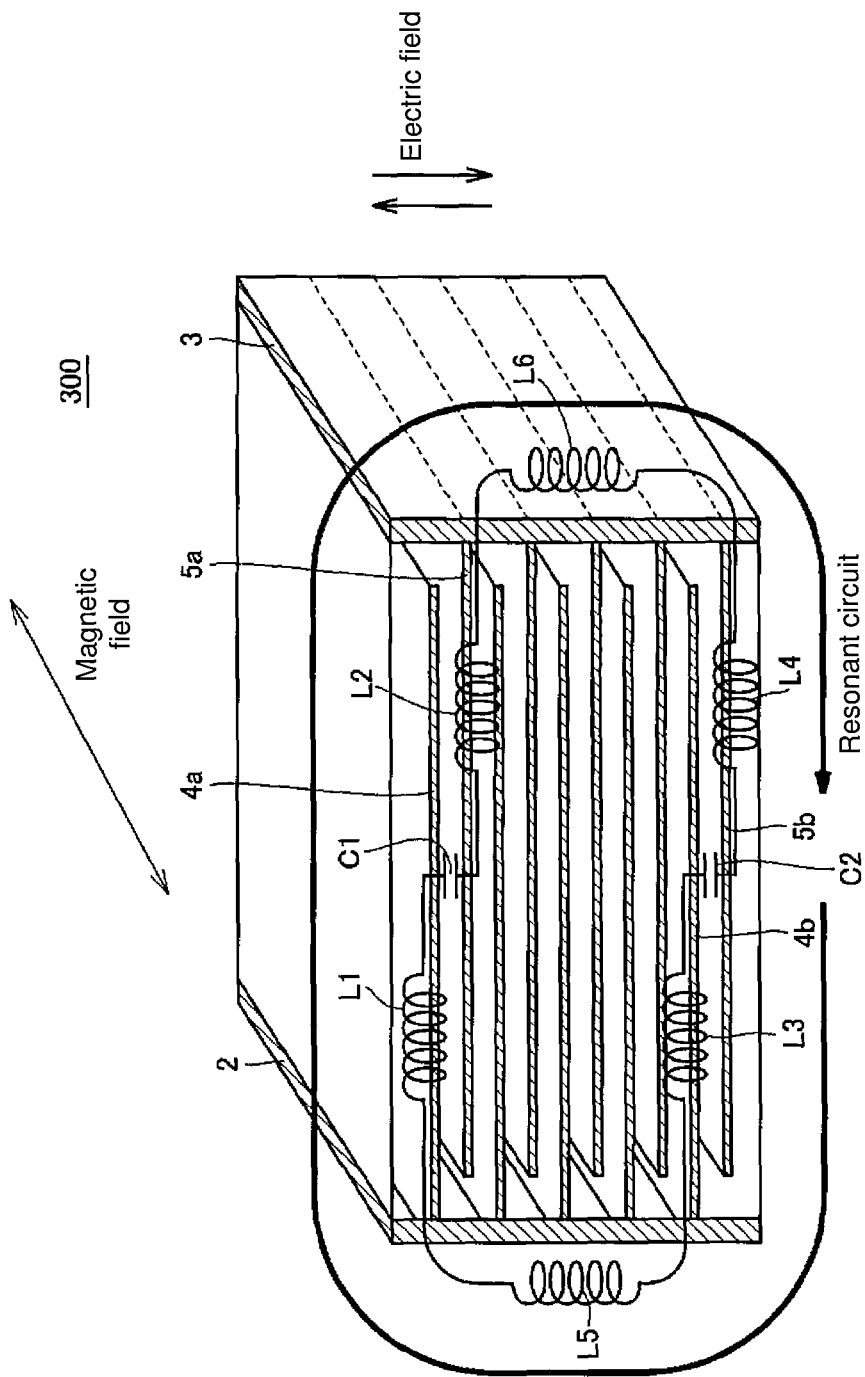
FIG. 3 is a diagram for explaining a resonant circuit formed in a capacitive resonator at a resonant frequency.

When the capacitive resonator 300 is placed to have a positional relationship as shown in FIG. 2, a resonant circuit as shown in FIG. 3 is formed with respect to a predetermined frequency component, and this resonant circuit develops a negative magnetic permeability.

FIG. 3 is a diagram for explaining a resonant circuit formed in the capacitive resonator 300 at a resonant frequency.

Referring to FIG. 3 the first internal electrodes 4 and second internal electrodes 5 as well as the first external electrode 2 and second external electrode 3, which are arranged so that the electrode planes thereof are substantially parallel to the line of magnetic force for the magnetic field, act as coils (inductors) depending on the path length of the electrodes.

In the capacitive resonator 300, the uppermost-layer electrode 4a among the first internal electrodes, the first external electrode 2, and the lowermost-layer electrode 4b among the first internal electrodes are electrically connected to each other, to form a current pathway including the uppermost-layer electrode 4a, the first external electrode 2, and the lowermost-layer electrode 4b. Likewise, the uppermost-layer electrode 5a among the second internal electrodes, the second external electrode 3, and the lowermost-layer electrode 5b among the second internal electrodes are also electrically connected to each other, to form a current pathway including the uppermost-layer electrode 5a, the second external electrode 3, and the lowermost-layer electrode 5b. In this case, the both current pathways are electrically connected to each other through a capacitance (C1) between the electrode 4a and the electrode 5a and a capacitance (C2) between the electrode 4b and the electrode 5b. As a result, a resonant circuit is formed which includes the capacitances C1 and C2 and inductances L1 to L6 generated by the respective electrodes. Therefore, the capacitive resonator 300 according to the present embodiment has a resonant frequency determined by the capacitance (C1+C2) and the inductance (L1+L2+L3+L4+L5+L6), and electromagnetic waves incident at this resonant frequency develop a resonance in terms of magnetic permeability.

It is to be noted that while a capacitance is generated respectively between the adjacent internal electrodes in the capacitive resonator 300, the other capacitances excluding the highest capacitance and the lowest capacitance have a small effect on the formation of this resonant circuit. This is because the electric current is concentrated on the outermost layer of the circulation pathway for giving rise to a resonance.

Figure 4:
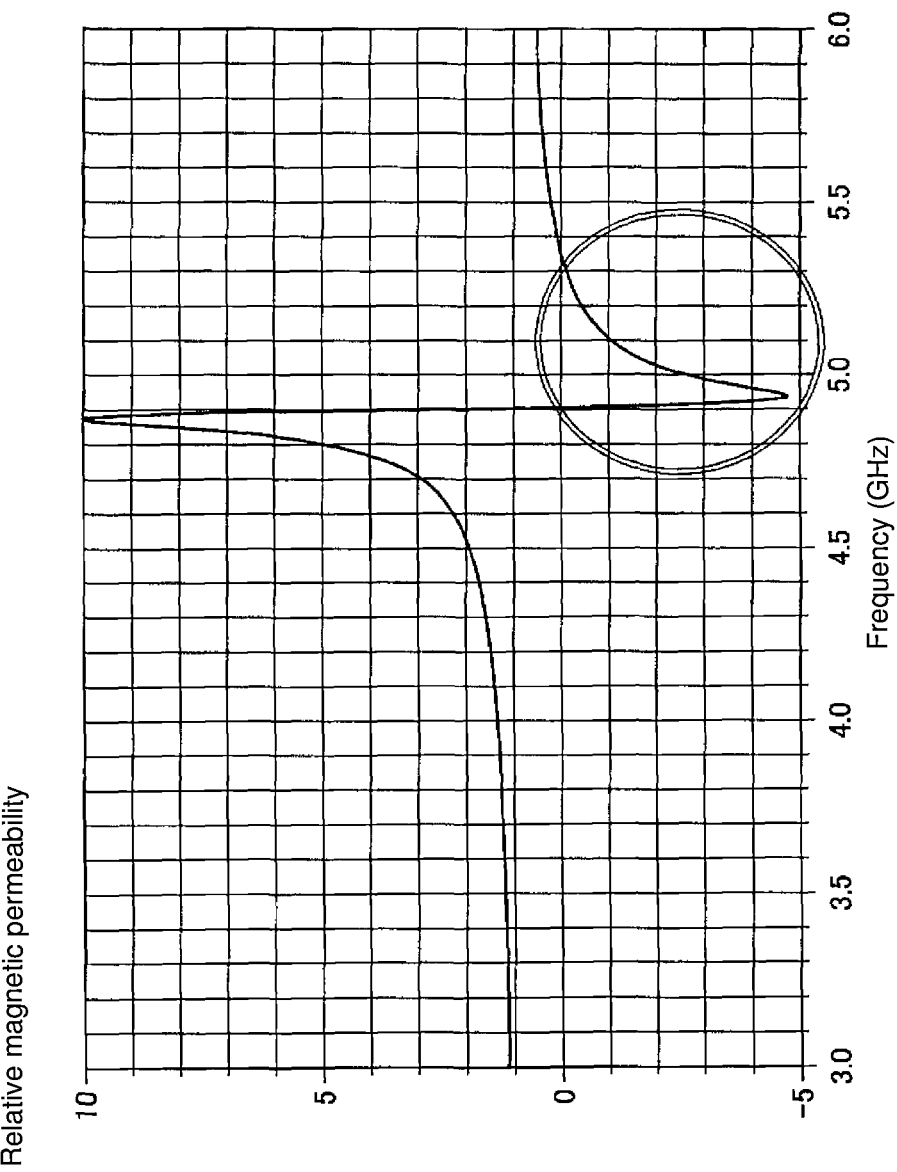
FIG. 4 is a diagram showing an example of frequency-relative magnetic permeability characteristics generated in a capacitive resonator.

FIG. 4 is a diagram showing an example of frequency-relative magnetic permeability characteristics developed in the capacitive resonator 300. It is to be noted that the change characteristics shown in FIG. 4 were calculated from simulation. The relative magnetic permeability in this case refers to the ratio of a magnetic permeability to a vacuum magnetic permeability.

Referring to FIG. 4, it is determined that the capacitive resonator 300 has a resonant frequency of about 4.9 GHz as one of its resonant frequency, and the relative magnetic permeability thus varies significantly around 4.9 GHz to develop a negative magnetic permeability.

The description above has demonstrated that the respective electrode planes of the first internal electrodes 4 and second internal electrodes 5 as well as of the first external electrode 2 and second external electrode 3, which are arranged substantially parallel to the line of magnetic force for the magnetic field, allow for the development of a negative magnetic permeability which is a function as a metamaterial. The term "substantially parallel" herein means the exclusion of the respective electrode planes orthogonal to the line of magnetic force for the magnetic field, and includes not only the respective electrode planes perfectly parallel to the line of magnetic force for the magnetic field, but also the respective electrode planes at a predetermined angle to the line of magnetic force. In practice, as long as the magnitude of a negative magnetic permeability developed in the capacitive resonator 300 has a value which can satisfy the demands of subject applications, etc, the state can be regarded as "substantially parallel".

(2. Coiled Resonator)

Next, a coiled resonator will be described which is another type of resonator far use in a metamaterial according to the present embodiment. The capacitive resonator described above develops a negative magnetic permeability, whereas the coiled resonator described below develops a negative dielectric constant when the central axis is placed so as to be parallel to a direction of electric field (perpendicular to the magnetic field). In addition, the coiled resonator develops a negative magnetic permeability when the central axis is placed so as to be perpendicular to a direction of electric field (parallel to the magnetic field).

Figure 5:
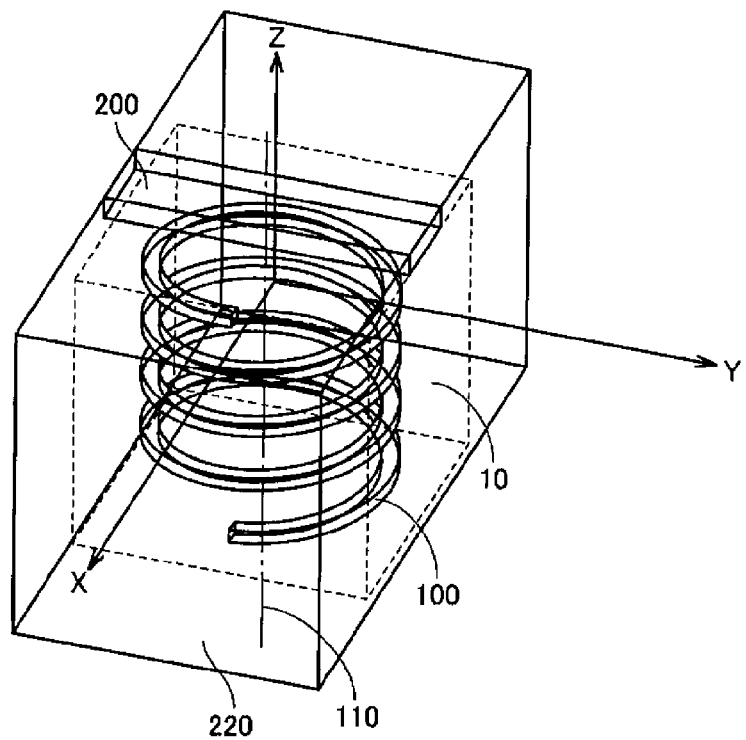
FIG. 5 is a diagram illustrating a metamaterial with a negative dielectric constant, which uses a coiled resonator.

First, the structure of a metamaterial which develops a negative dielectric constant with the use of a coiled resonator will be described with reference to FIG. 5. FIG. 5 is a diagram for explaining the structure of a metamaterial which develops a negative dielectric constant with the use of a coiled resonator.

The metamaterial shown in FIG. 5 includes a coiled resonator 100 and an outer covering 10. The coiled resonator 100 is covered with the outer covering 10 which is a nonmagnetic body. The coiled resonator 100 is placed between a signal line 200 and a ground 220. The ground 220 is set on the side of the outer covering 10 opposite to the side in contact with the signal line 200 of the coiled resonator 100.

An electric current including a predetermined frequency component flows through the signal line 200. In the present embodiment, the signal line 200 is supposed to be a strip line. However, the signal line 200 is just an example of the conductor passing electric currents, and is not to be considered limited to the form of the conductor.

The coiled resonator 100 is made by coiling a metallic wire. The total length of the coiled resonator 100 (the total length of the metallic wire) is about half the wavelength of an electric current flowing through the signal line 200. In this case, the electric current flowing through the signal line 200 has a frequency in the GHz band, and the coiled resonator 100 has a length of 28 mm.

In FIG. 5, as the coiled resonator 100, the metallic wire is coiled with a central axis 110 as a center. More specifically, the coiled resonator 100 in the shape of a spring is shown in FIG. 5. However, the shape of the coiled resonator 100 is not limited to the coiled shape along a cylindrical surface as shown in FIG. 5. For example, the coiled resonator 100 may have a shape curling along a square pillar. Alternatively, the coiled resonator 100 may have a shape curling along a spherical surface.

The coiled resonator 100 may have a length and a shape as described above. As the coiled resonator 100, coils of coiled metallic wires can be used. As the coiled resonator 100, commercially available resonators (for example, commercially available coils) may be used, or specially made resonators may be used.

The outer covering 10 fixes the position of the coiled resonator 100. As the outer covering 10, resin materials such as Teflon (registered trademark) are suitable. However, the outer covering 10 is just an example of the supporting member for fixing the position of the coiled resonator 100, and the coiled resonator 100 may be fixed by other member.

The central axis 110 of the coiled resonator 100 is parallel to an electric field generated by an electric current flowing through the signal line 200, more particularly, an electric field generated between the signal line 200 and the ground 220. More specifically, the outer covering 10 fixes the coiled resonator 100 so that the central axis 110 is parallel to the electric field. In other words, the coiled resonator 100 is placed so that a difference in electric potential is produced across the ends of the coil in accordance with the gradient of the electric field.

In the example shown in FIG. 5, the central axis 110 is set in a direction from the signal line 200 toward the ground 220. More specifically, the central axis 110 is orthogonal to the plane of the ground 220, and penetrating through the signal line 200. This arrangement makes the central axis 110 parallel to an electric field created by the electric current flowing through the signal line 200 (perpendicular to a magnetic field created by the electric current flowing through the signal line 200).

With respect to the signal line 200, the coiled resonator 100 gives rise to a resonance in response to a specific frequency (resonant frequency) component in the electric field generated by the electric current flowing through the signal line 200.

Figure 6:
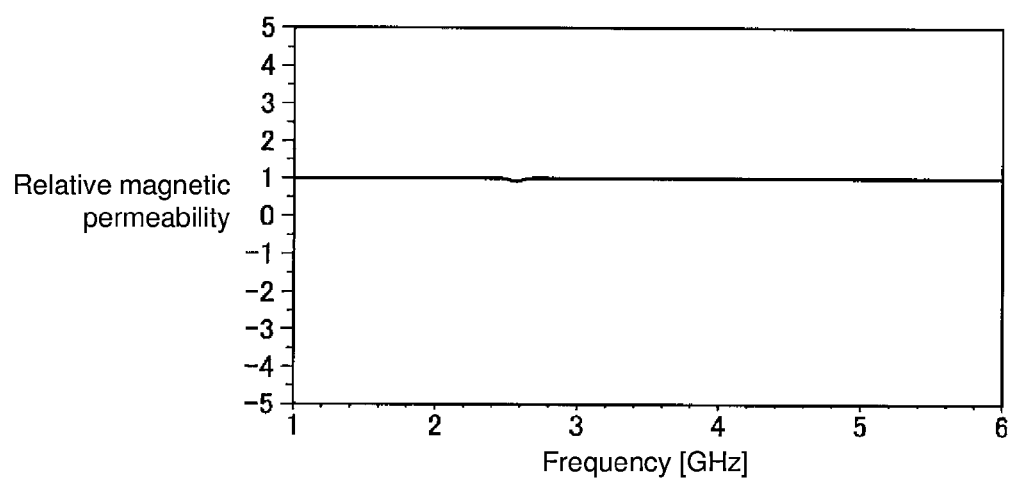
FIG. 6 is a diagram showing the relative magnetic permeability of the metamaterial shown in FIG. 5.
Figure 7:
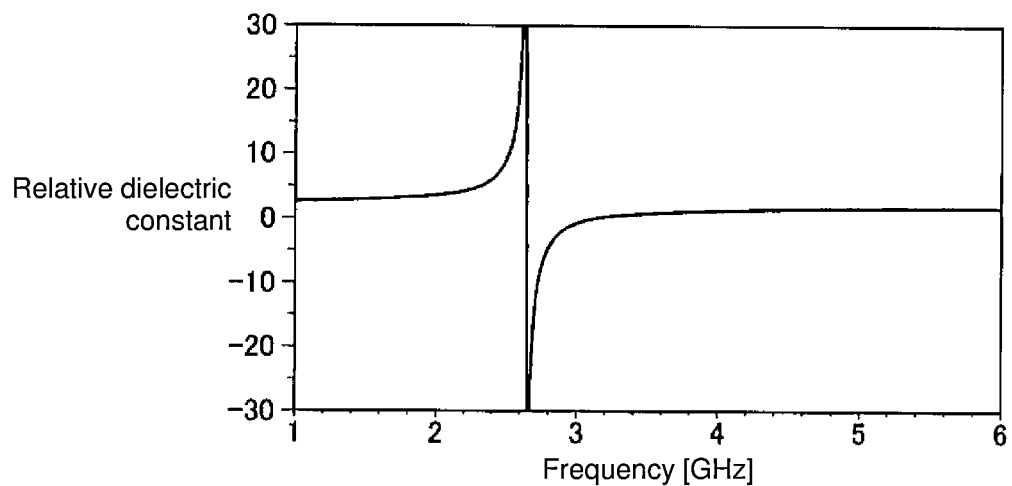
FIG. 7 is a diagram showing the relative dielectric constant of the metamaterial shown in FIG. 5.

With reference to FIGS. 6 and 7, electromagnetic characteristics of the coiled resonator 100 will be described. The relative magnetic permeability and relative dielectric constant exhibited by the metamaterial shown in FIG. 5 are respectively shown in FIGS. 6 and 7. The relative dielectric constant used herein represents the ratio of a dielectric constant to a vacuum dielectric constant, whereas the relative magnetic permeability represents the ratio of a magnetic permeability to a vacuum magnetic permeability. As shown in FIG. 7, the metamaterial shown in FIG. 5 exhibits a negative dielectric constant around 2.6 GHz. On the other hand, the relative magnetic permeability is constantly positive as shown in FIG. 6.

As described above, it is determined that the coiled metallic wire which is ½ the wavelength in length develops a negative dielectric constant. Thus, the metamaterial using the coiled metallic wire can be reduced in size as compared with a metamaterial which develops a negative dielectric constant with use of a linear metallic wire.

Next, an example will be described in which a metallic wire in the shape of a spring is used to develop a metamaterial with a negative magnetic permeability (μ). The metamaterial with a negative magnetic permeability μ is achieved by placing a coiled resonator 100 which has the same length and shape as those of the coiled resonator 100 shown in FIG. 5 so that a central axis 110 of the coiled resonator 100 is parallel to the magnetic field. The thus placed coiled resonator 100 exhibiting a negative magnetic permeability will be described with reference to FIGS. 8 through 10.

Figure 8:
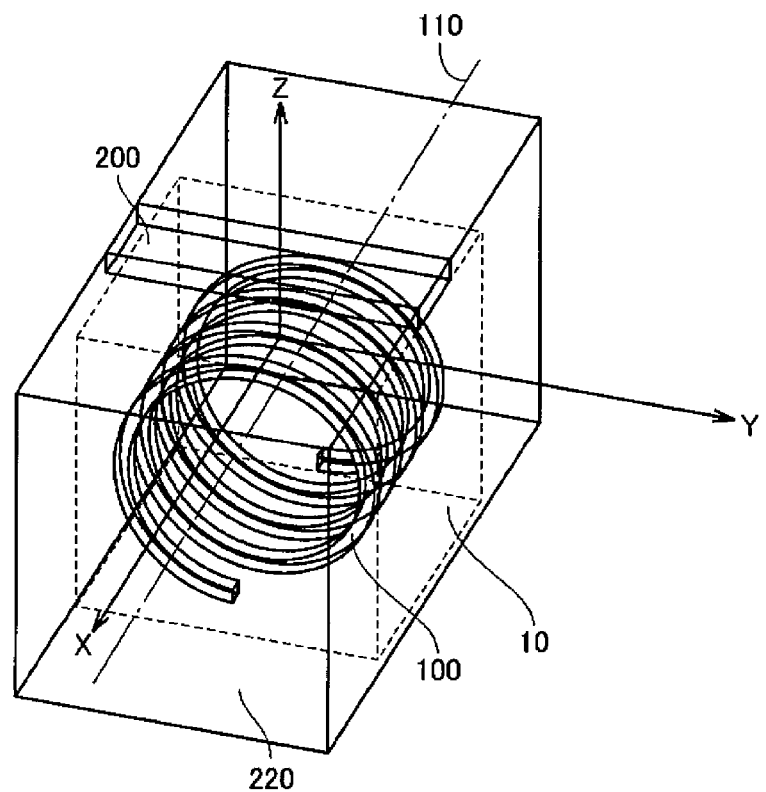
FIG. 8 is a diagram illustrating a metamaterial with a negative magnetic permeability, which uses a coiled resonator.

FIG. 8 is a diagram for explaining the structure of a metamaterial which develops a negative dielectric constant with the use of a coiled resonator. The metamaterial shown in FIG. 8 is derived from the placement of the coiled resonator 100 shown in FIG. 6 rotated by 90 degrees around the Y axis so that the central axis of the coiled resonator 100 is parallel to a magnetic field generated by an electric current flowing through the signal line 200 (perpendicular to an electric field created by the electric current flowing through the signal line 200).

Figure 9:
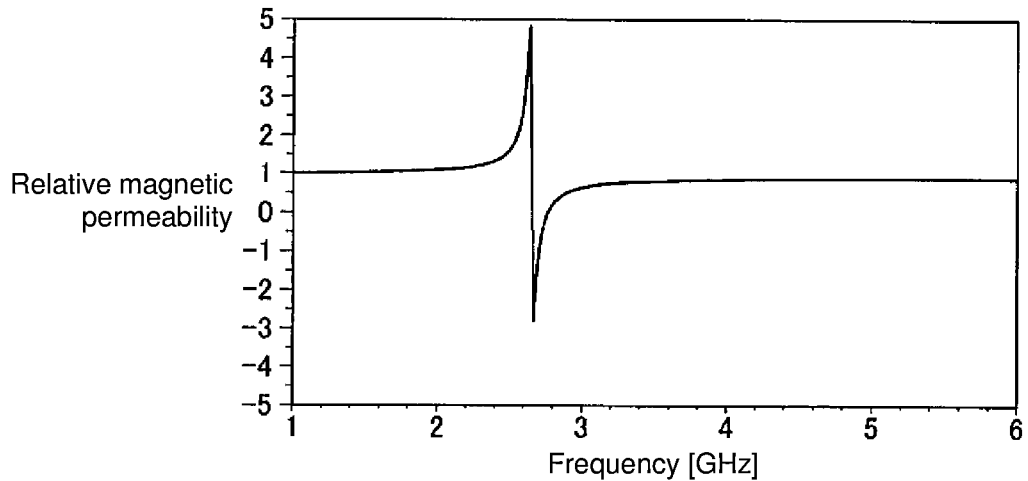
FIG. 9 is a diagram showing the relative magnetic permeability of the metamaterial shown in FIG. 8.
Figure 10:
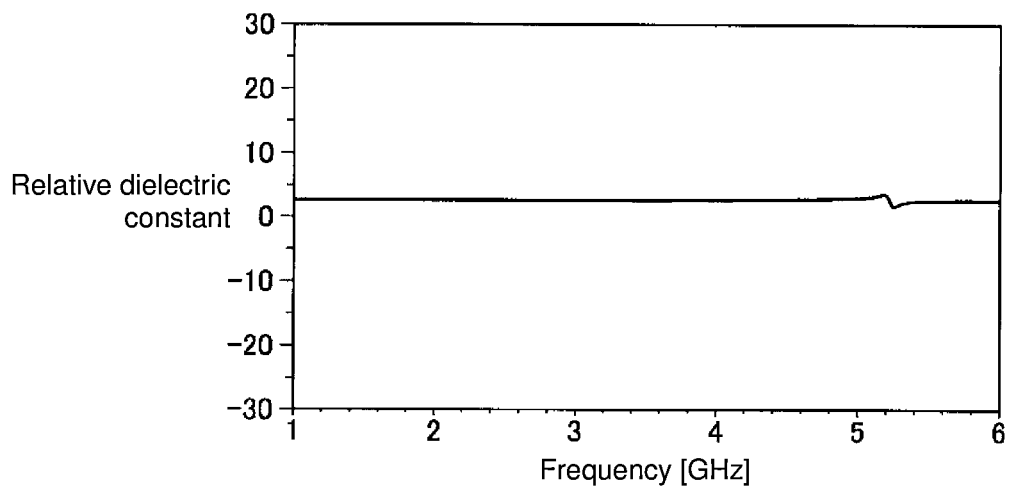
FIG. 10 is a diagram showing the relative dielectric constant of the metamaterial shown in FIG. 8.

The relative magnetic permeability and relative dielectric constant exhibited by the metamaterial shown in FIG. 8 are respectively shown in FIGS. 9 and 10. As shown in FIG. 9, the metamaterial shown in FIG. 8 exhibits a negative magnetic permeability around 2.6 GHz. On the other hand, the relative dielectric constant is constantly positive as shown in FIG. 10.

It is determined that the central axis changed in direction as described above causes the coiled resonator 100 which has the same structure to both exhibit a negative dielectric constant in some cases and exhibit a negative magnetic permeability in some cases. It is to be noted that the coiled resonator 100 is placed so that the central axis direction is nonorthogonal to the magnetic field direction and the electric field direction exhibits a negative dielectric constant and magnetic permeability at the same time.

First Embodiment

As a metamaterial according to a first embodiment of the present invention, an arrangement of a coiled resonator and a capacitive resonator will be described.

The combination of these resonators serves as a left-handed metamaterial, that is, the arrangement and structures of the respective resonators are important in order to develop a negative magnetic permeability and a negative dielectric constant at the same time. First, the respective resonators have to be arranged so that the coiled resonator develops a negative dielectric constant and the capacitive resonator develops a negative magnetic permeability. Furthermore, it is also necessary to consider the structures of the resonators so as to cause no improper interferences between the resonators.

In order for the coiled resonator to develop a negative dielectric constant, the coiled resonator may be placed so that the axis of the resonator is parallel to the electric field direction (referred to as the z direction). On the other hand, the capacitive resonator may be placed in such a way that internal polar plates of the capacitive resonator are parallel to the magnetic field direction, that is, parallel to the plane (x-y plane) with its normal line in the z direction, so that the capacitive resonator develops a negative magnetic permeability.

In addition to the condition for the arrangement as described above, the capacitive resonator preferably satisfies the condition that the two outermost internal electrodes have reverse phases, that is, electric charges accumulated in the respective internal electrodes have opposite signs. This condition should be satisfied for avoiding the capacitive resonator and the coiled resonator from interfering with each other. The reason will be described below in more detail with reference to FIGS. 11 through 16.

Figure 11:
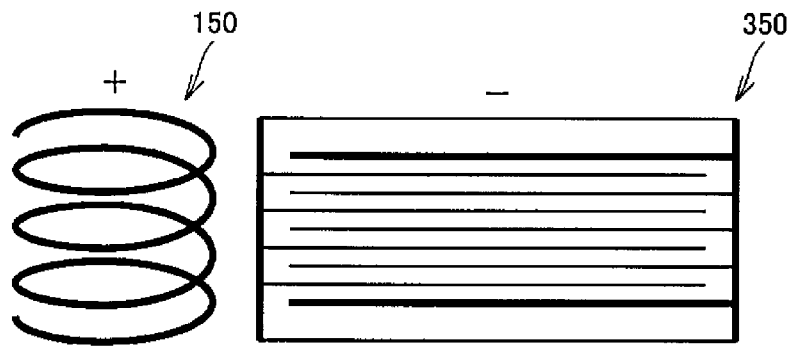
FIG. 11 is a diagram illustrating a capacitive resonator with outermost internal electrodes connected directly and a coiled resonator.

FIG. 11 is a diagram illustrating a capacitive resonator 350 with outermost internal electrodes connected directly and a coiled resonator 150. These resonators are placed close to each other. However, the coiled resonator 150 and the capacitive resonator 350 are not electrically connected. Since coiled resonator 150 is placed in an electric field, electric charges with different signs will appear at either end thereof. FIG. 11 shows a positive electric charge (+ in FIG. 11) appearing on the top and a negative electric charge (− in FIG. 11) appearing on the bottom. The signs of electric charges at either end are reversed at an antiresonant frequency to generate a reversed electric field vector and thus develop a negative dielectric constant.

On the other hand, the uppermost electrode and lowermost electrode of the capacitive resonator 350 shown in FIG. 11 are electrically connected directly by an external electrode through the uppermost electrode, and will thus accumulate electric charges with the same sign. FIG. 11 shows a case of the uppermost electrode and lowermost electrode both negatively charged.

In the condition shown in FIG. 11, the negative charges accumulated on the lowermost electrode and on the lower end of the coiled resonator 150 which are placed close to each other interfere with each other. Therefore, a negative dielectric constant and a negative magnetic permeability will not be produced at the same time. More specifically, the antiresonant frequency for a negative dielectric constant and the antiresonant frequency for a negative magnetic permeability will not be coincident with each other.

Figure 12:
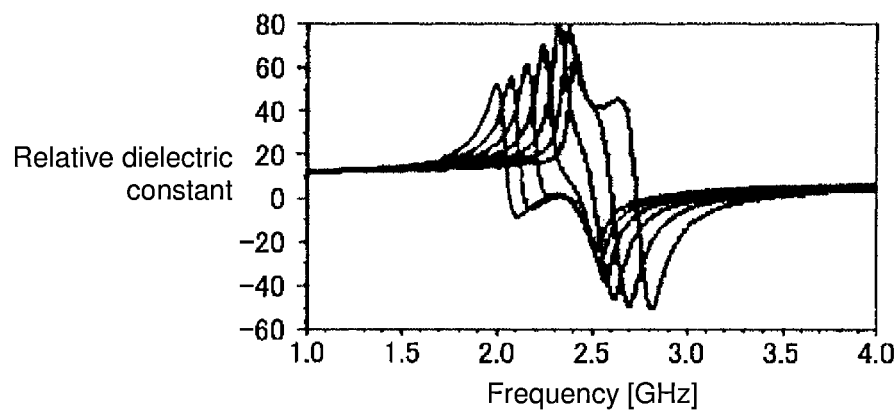
FIG. 12 is a diagram showing the relative dielectric constant of the group of resonators shown in FIG. 11.
Figure 13:
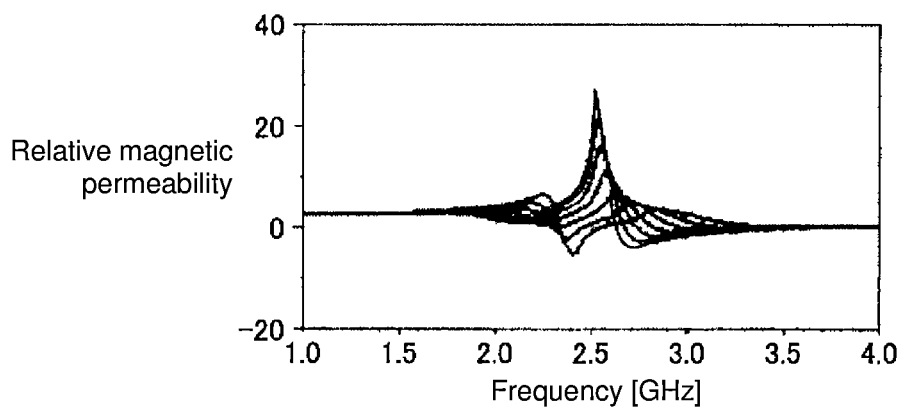
FIG. 13 is a diagram showing the relative magnetic permeability of the group of resonators shown in FIG. 11.

This will be described specifically with reference to FIGS. 12 and 13. FIG. 12 is a diagram showing the relative dielectric constant of the group of resonators shown in FIG. 11. FIG. 13 is a diagram showing the relative magnetic permeability of the group of resonators shown in FIG. 11.

FIG. 12 shows relative dielectric constant characteristics of the whole group of resonators in the case of changing the shape (length, etc.) of the coiled resonator. Depending on changes in the shape of the coiled resonator, the resonant frequency for the dielectric constant is changed, and the frequency for producing a negative dielectric constant is thus changed.

FIG. 13 shows relative magnetic permeability characteristics of the whole group of resonators in the case of changing the shape (length, etc.) of the coiled resonator. Depending on changes in the shape of the coiled resonator, the resonant frequency for the magnetic permeability is changed, and the frequency for producing a negative magnetic permeability is thus changed. Due to interference of charges at the ends of the respective resonators, the resonant frequency for the magnetic permeability is changed although the shape of the capacitive resonator is not changed.

When the shape of the coiled resonator is changed as described above, the band for producing a negative dielectric constant and the band for producing a negative magnetic permeability are both changed. Therefore, it is not possible to develop a negative dielectric constant and a negative magnetic permeability at the same frequency. As the frequency for developing a negative dielectric constant (magnetic permeability) is increased, the frequency for developing a negative magnetic permeability (dielectric constant) will be also increased. In contrast, as the frequency for developing a negative dielectric constant (magnetic permeability) is decreased, the frequency for developing a negative magnetic permeability (dielectric constant) will be also decreased. As described above, the phenomenon is caused in which the resonant frequency for the magnetic permeability (dielectric constant) is kept away from the resonant frequency for the dielectric constant (magnetic permeability), and it is thus difficult to design a resonator so as to develop a negative dielectric constant and a negative magnetic permeability at the same frequency.

Figure 14:
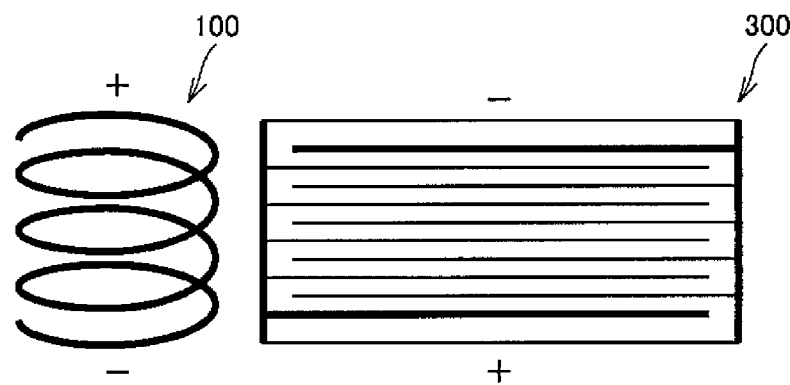
FIG. 14 is a diagram illustrating a metamaterial according to a first embodiment.

Thus, a metamaterial according to the present embodiment has two types of resonators placed as shown in FIG. 14. The metamaterial according to the present embodiment includes a coiled resonator 100, a capacitive resonator 300, and an outer covering 10 (not shown in FIG. 14). In the same way as in the case shown in FIG. 11, the outer covering 10 fixes the capacitive resonator and the coiled resonator closely in positions closed to each other. It is to be noted that other supporting members may be used instead of the outer covering 10 as described previously.

The coiled resonator is placed in an electric field in the same way as in the case of FIG. 11, and electric charges with different signs will thus appear at either end thereof. FIG. 14 also shows a positive electric charge (+ in FIG. 14) appearing on the top and a negative electric charge (− in FIG. 14) appearing on the bottom, as in the case of FIG. 11. The signs of electric charges at either end are reversed at an antiresonant frequency to generate a reversed electric field vector and thus develop a negative dielectric constant.

On the other hand, the capacitive resonator is different from the capacitive resonator shown in FIG. 11. The uppermost electrode and lowermost electrode of the capacitive resonator in FIG. 14 are not electrically connected directly by an external electrode, but connected with a capacitance interposed therebetween. Therefore, the uppermost electrode and lowermost electrode have reverse phases (accumulate electric charges with opposite signs). FIG. 14 shows the uppermost electrode negatively charged and the lowermost electrode positively charged.

In the condition shown in FIG. 14, it is possible to prevent interference of electric charges accumulated on the lowermost (or uppermost) electrode and the lower end (or upper end) of the coiled resonator which are placed close to each other, unlike the condition shown in FIG. 11. Accordingly, a negative dielectric constant and a negative magnetic permeability can be produced at the same time. More specifically, the antiresonant frequency for a negative dielectric constant can be made coincident with the antiresonant frequency for a negative magnetic permeability.

Figure 15:
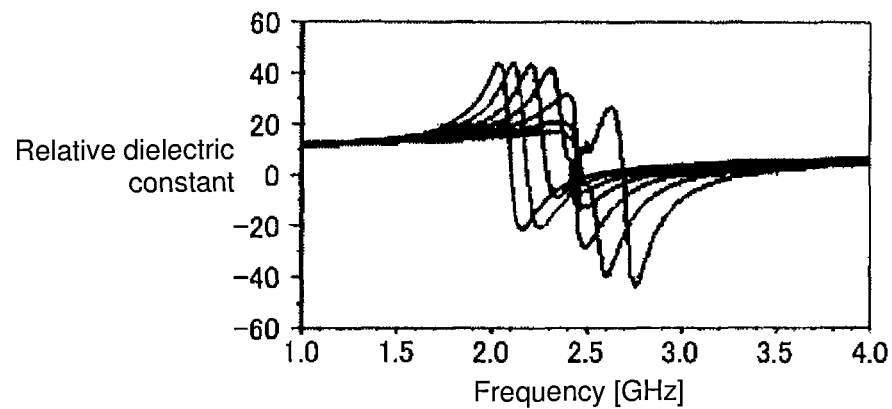
FIG. 15 is a diagram showing the relative dielectric constant of the group of resonators shown in FIG. 14.

This will be described specifically with reference to FIGS. 15 and 16. FIG. 15 shows relative dielectric constant characteristics of the whole group of resonators in the case of changing the shape of the coiled resonator. Depending on changes in the shape of the coiled resonator, the resonant frequency for the dielectric constant is changed, and the frequency for producing a negative dielectric constant is thus changed.

Figure 16:
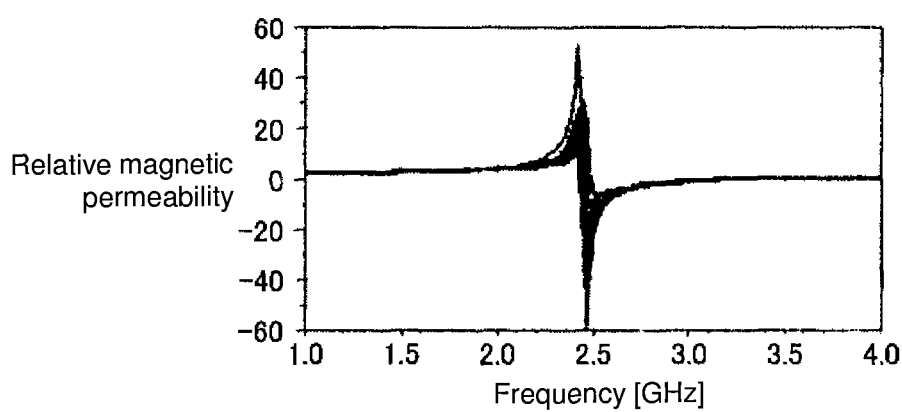
FIG. 16 is a diagram showing the relative magnetic permeability of the group of resonators shown in FIG. 14.

FIG. 16 shows relative magnetic permeability characteristics of the whole group of resonators in the case of changing the shape of the coiled resonator. Unlike FIG. 13 described above, the resonant frequency for the magnetic permeability shown in FIG. 16 keeps about the same characteristics even when the shape of the coiled resonator is changed. This is because of the prevention of interference of electric charges on the ends of the respective resonators, resulting in unchanged resonance characteristics of the capacitive resonator.

As described above, the metamaterial according to the present embodiment can develop a negative dielectric constant and a negative magnetic permeability, which serves as a left-handed metamaterial.

It is to be noted that while a set of one coiled resonator and one capacitive resonator is shown in FIG. 14, the metamaterial may include multiple sets of coiled resonators and capacitive resonators. In this case, for example, the respective sets are fixed by a supporting member in one-dimensionally or two-dimensionally continuous positions.

Second Embodiment

In the first embodiment, an example is given in which the coiled resonator is used as a resonator for developing a negative dielectric constant $\in$. However, the resonator for developing a negative dielectric constant $\in$ is not limited to the coiled resonator, and it is possible to use resonators including a line with a length of substantially $\lambda/2$, which resonates with electromagnetic waves.

In addition, it is not always necessary to laterally place a resonator for developing a negative dielectric constant $\in$ and a resonator for developing a negative magnetic permeability $\mu$ (the capacitive resonator in the first embodiment) as described in the first embodiment.

In the second embodiment, a resonator including a line with a length of $\lambda/2$ and two conductive plates connected to the both ends of the line is used as the resonator for developing a negative dielectric constant $\in$. Thus, a configuration will be described in which the resonator for developing a negative dielectric constant $\in$ and a resonator for developing a negative magnetic permeability $\mu$ are combined in a common space to achieve a metamaterial.

Figure 17:
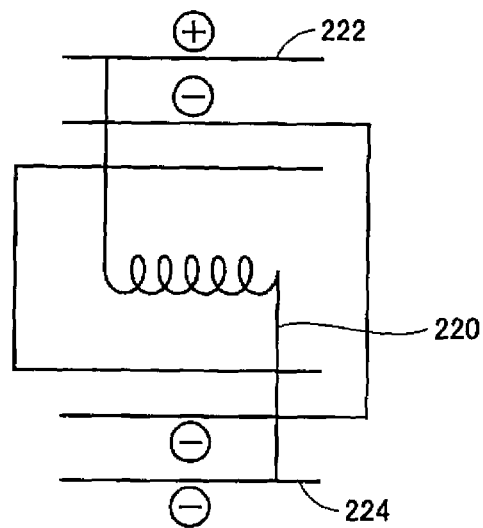
FIG. 17 is a schematic view of a metamaterial related to a metamaterial according to a second embodiment.
Figure 18:
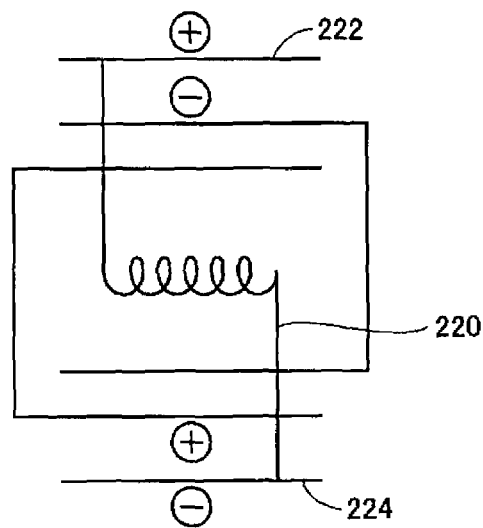
FIG. 18 is a schematic view illustrating a metamaterial according to the second embodiment.

The schematic configuration of a metamaterial according to the second embodiment will be described with reference to FIGS. 17 and 18. FIG. 17 is a schematic view of a metamaterial related to a metamaterial according to the second embodiment. FIG. 18 is a schematic view of a metamaterial according to the second embodiment.

In each of FIGS. 17 and 18, two conductive plates 222 and 224 are placed outside two outermost electrodes of a capacitive resonator, so as to be opposed to the respective outermost electrodes. In addition, the conductive plate 222 and the conductive plate 224 are connected to each other by a coiled line 220. The line 220 is designed to have a length of substantially resonant wavelength $\lambda/2$.

The line 220, which is coiled, can ensure its length in a small space. However, depending on the resonant wavelength or in the case of eliminating the need for reduction in size, the line may or may not be coiled. In addition, while the coiled line 220 is shown in FIGS. 17 and 18, the reduction in size is not limited to the method of coiling a line, and is achieved by bending a line. For example, Meander lines, etc. may be used.

The conductive plates 222 and 224 increases the capacitance between the line and the conductive plates, increases the absolute value of a negative dielectric constant at a resonant frequency, and shortens the resonant wavelength. It is to be noted that no conductive plate may be provided depending on the value of the negative dielectric constant obtained. For design reasons, etc, a conductive plate may be connected to only one end of the line.

FIG. 17 differs from FIG. 18 in that the two outermost electrodes of the capacitive resonator are connected directly in FIG. 17, whereas the two outermost electrodes are not directly connected to have reverse phases in FIG. 18. The metamaterial shown in FIG. 18 according to the present embodiment prevents interference of electric charges as in the case of the metamaterial according to the first embodiment, and can thus develop a negative dielectric constant and a negative magnetic permeability at the same time. In contrast, it is difficult for the structure shown in FIG. 17 to develop a negative dielectric constant and a negative magnetic permeability at the same time.

Figure 19:
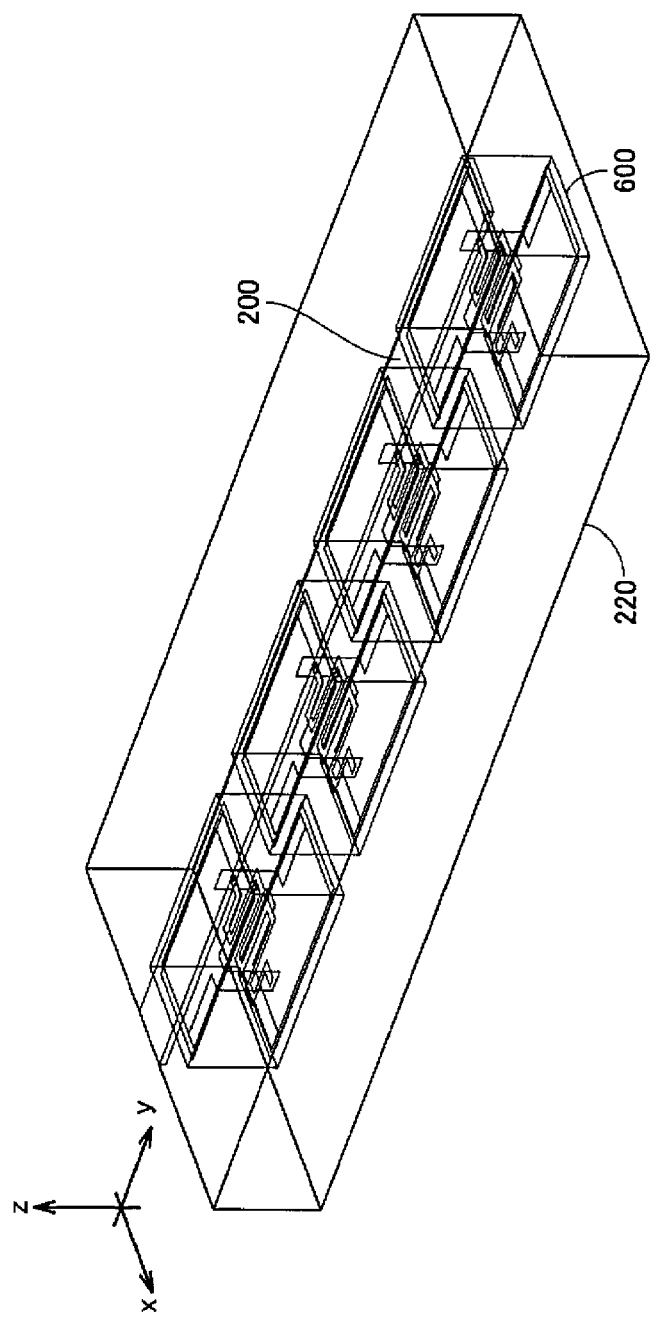
FIG. 19 is a diagram illustrating the configuration of the metamaterial according to the second embodiment.

FIG. 19 shows a specific configuration of the metamaterial schematically shown in FIG. 18 according to the present embodiment. Referring to FIG. 19, the metamaterial according to the present embodiment includes a plurality of units 600 which each have a resonator for a negative dielectric constant and a resonator for a negative magnetic permeability built in a substrate material. This unit refers to a resonator for a negative dielectric constant and a resonator for a negative magnetic permeability built in one ship with the use of a technique such as a multilayer substrate. In the case of this configuration, the substrate material corresponds to a supporting member.

The respective units 600 are placed just below a signal line 200 and between the signal line 200 and a ground 220. In addition, the respective units 600 are arranged in a spatially continuous manner. While an example is shown in FIG. 19 in which the four units 600 are arranged in a direction along the signal line 200, the arrangement of the units 600 is not to be considered limited thereto. One-dimensionally arranged resonators may be placed in the same plane to constitute a planar metamaterial. Furthermore, planar metamaterials may be stacked to constitute a three-dimensional metamaterial.

Figure 20:
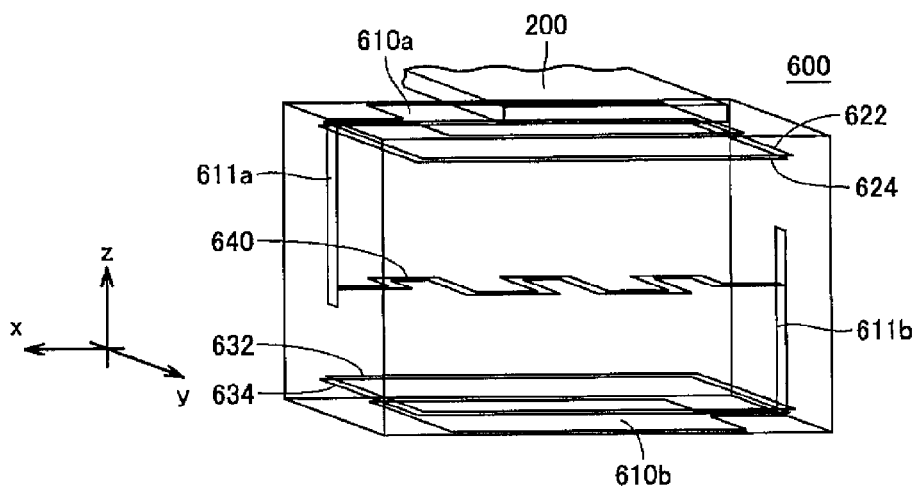
FIG. 20 is a perspective view of a unit included in the metamaterial shown in FIG. 19.
Figure 21:
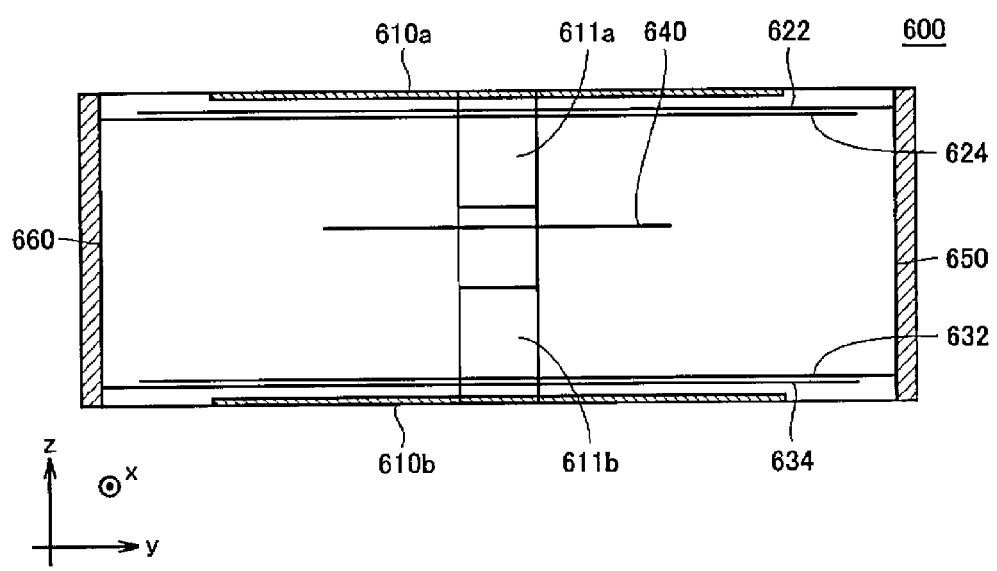
FIG. 21 is a side view of the unit included in the metamaterial shown in FIG. 19 from the y direction.

The structure of the unit 600 will be described with reference to FIGS. 20 and 21. FIG. 20 is a perspective view of the unit 600. FIG. 21 is a side view of the unit 600 from the y direction.

As shown in FIG. 20, the unit 600 includes an uppermost part electrode 610a, a lowermost part electrode 610b, a first internal electrode 622, a second internal electrode 624, a third internal electrode 632, a fourth internal electrode 634, and a line 640. In addition, as shown in FIG. 21, the unit 600 further includes a first external electrode 650 and a second external electrode 660.

The uppermost part electrode 610a is placed above the first internal electrode 622, the second internal electrode 624, the third internal electrode 632, and the fourth internal electrode 634 (in a position with larger z coordinates). The lowermost part electrode 610b is placed below the first internal electrode 622, the second internal electrode 624, the third internal electrode 632, and the fourth internal electrode 634 (in a position with smaller z coordinates). The uppermost part electrode 610a has a side section 611a extending in the −z direction. The lowermost part electrode 610b has a side section 611b extending in the +z direction. In addition, the uppermost part electrode 610a is placed just under the signal line 200.

The line 640 electrically connects the side section 611a of the uppermost part electrode 610a extending in the −z direction to the side section 611b of the lowermost part electrode 610b extending in the +z direction. The line 640 electrically connects the uppermost part electrode 610a and lowermost part electrode 610b to the side sections 611a, 611b, thereby serving as a part of the $\lambda/2$ line for achieving a negative dielectric constant.

The length of the line including the line 640 and the side sections 611a, 611b is designed depending on the resonant frequency. Since the line has a length of $\lambda/2$ in this case, the line 640 is regarded as a Meander line drawn in the central layer. However, the shape of the line 640 is not limited to this Meander line, and for example, a helical line and a spiral line may be employed.

It is to be noted that the uppermost part electrode 610a and the lowermost part electrode 610b are provided to increase the absolute value of a negative dielectric constant and shorten the resonant wavelength as already described. The resonant wavelength is shortened by the wavelength shortening effect due to the capacitance between the uppermost part electrode 610a and the signal line. It is also possible to omit the uppermost part electrode 610a and the lowermost part electrode 610b depending on the required negative dielectric constant or resonant wavelength.

The first internal electrode 622 and the second internal electrode 624 are placed closely and opposed to each other. In addition, the third internal electrode 632 and the fourth internal electrode 634 are placed closely and opposed to each other. The pair of first internal electrode 622 and second internal electrode 624 (referred to as an upper pair of electrodes) is placed on the side of the uppermost part electrode 610a. The pair of third internal electrode 632 and fourth internal electrode 634 (referred to as a lower pair of electrodes) is placed on the side of the lowermost part electrode 610b. The respective internal electrode planes are placed parallel to the direction of a magnetic field (perpendicular to the direction of an electric field) generated by an electric current flowing through the signal line 200.

The first external electrode 650 electrically connects the first internal electrode 622 and the third internal electrode 632 as shown in FIG. 21. The second external electrode 660 electrically connects the second internal electrode 624 and the fourth internal electrode 634 as shown in FIG. 21. The external electrode planes 650 and 660 are placed parallel to the direction of a magnetic field (perpendicular to the direction of an electric field) generated by an electric current flowing through the signal line 200.

The line 640, the uppermost part electrode 610a, and the lowermost part electrode 610b develop a negative dielectric constant. The first to fourth internal electrodes 622, 624, 632, 634 and the first and second external electrodes 650, 660 form a capacitive resonator including two upper electrodes and two lower electrodes to develop a negative magnetic permeability. It is naturally that the λ/2 line for developing a negative dielectric constant and the capacitive resonator for developing a negative magnetic permeability are not electrically connected directly to each other. In addition, the λ/2 line and the capacitive resonator in a floating state are not electrically connected to the signal line 200 and the ground 220. In addition, the respective units 600 are not brought into contact with each other.

The spatially continuous arrangement of the plurality of units 600 as described above causes the metamaterial according to the present embodiment to function as a left-handed metamaterial. It is to be noted that how to arrange the units 600 is not limited to the arrangement described above. For example, the units 600 may be arranged two-dimensionally in a plane.

The metamaterial according to the present embodiment is created by building a resonator for a negative dielectric constant and a resonator for a negative magnetic permeability in a unit, and thus industrially manufactured without any difficulty.

Third Embodiment

In the third embodiment, a metamaterial will be described which uses a split ring resonator instead of the capacitive resonator according to the second embodiment.

Figure 22:
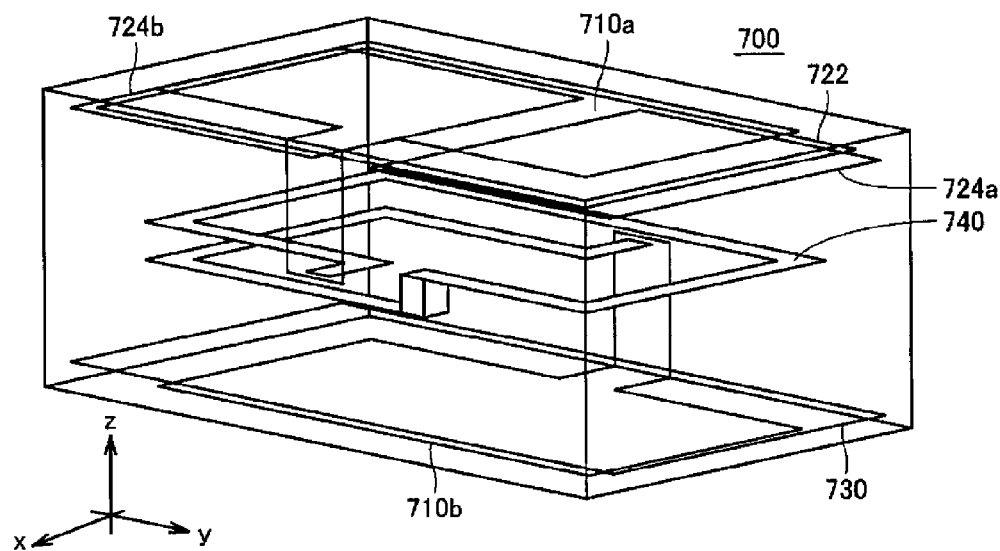
FIG. 22 is a perspective view of a unit included in a metamaterial according to a third embodiment.
Figure 23:
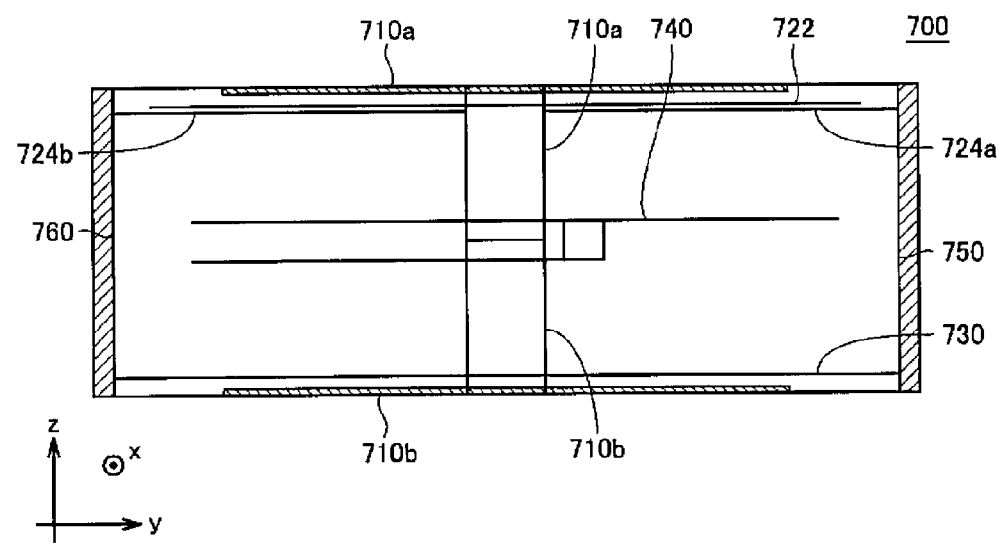
FIG. 23 is a side view of the unit included in the metamaterial according to the third embodiment.

FIGS. 22 and 23 show the structure of a unit 700 included in a metamaterial according to the third embodiment. FIG. 22 is a perspective view of the unit 700. FIG. 23 is a side view of the unit 700.

Referring to FIG. 22, the unit 700 includes an uppermost part electrode 710a, a lowermost part electrode 710b, a first internal electrode 722, a second internal electrode 724a, a third internal electrode 724b, a fourth internal electrode 730, and a line 740. Referring to FIG. 23, the unit 700 further includes a first external electrode 750 and a second external electrode 760.

The uppermost part electrode 710a and the lowermost part electrode 710b have the same structures as the uppermost part electrode 610a and lowermost part electrode 610b according to the second embodiment, and are placed outside any of the internal electrodes.

The line 740 electrically connects the uppermost part electrode 710a and the lowermost part electrode 710b. The line 740 serves as a part of the λ/2 line as in the case of the line 640 according to the second embodiment to develop a negative dielectric constant. It is to be noted that a helical structure curling one and half in a horizontal plane is employed as the line 740 in the present embodiment.

The second internal electrode 724a and the third internal electrode 724b are placed spaced apart at a predetermined distance in the same plane. The first external electrode 750 electrically connects the second internal electrode 724a to the fourth internal electrode 730. The second external electrode 760 electrically connects the third internal electrode 724b to the fourth internal electrode 730. More specifically, the second internal electrode 724a, the first external electrode 750, the third internal electrode 724b, the second external electrode 760, and the third internal electrode 730 have the same structure as a split ring resonator. Accordingly, these electrodes develop a negative magnetic permeability.

The first internal electrode 722 is placed so as to be opposed to the second internal electrode 724a and the third internal electrode 724b, and so as not to come into electrical contact with the second internal electrode 724a and the third internal electrode 724b. The first internal electrode 722 serves to compensate for a capacitance in a discontinuous section between the second internal electrode 724a and the third internal electrode 724b and thus decrease the resonant frequency.

Fourth Embodiment

As another example of a metamaterial in which a resonator for a negative dielectric constant and a resonator for a negative magnetic permeability are built in one chip, a resonator for a negative magnetic permeability can also be placed in a coil placed circumferentially. In the fourth embodiment, an example of such a metamaterial will be given.

Figure 24:
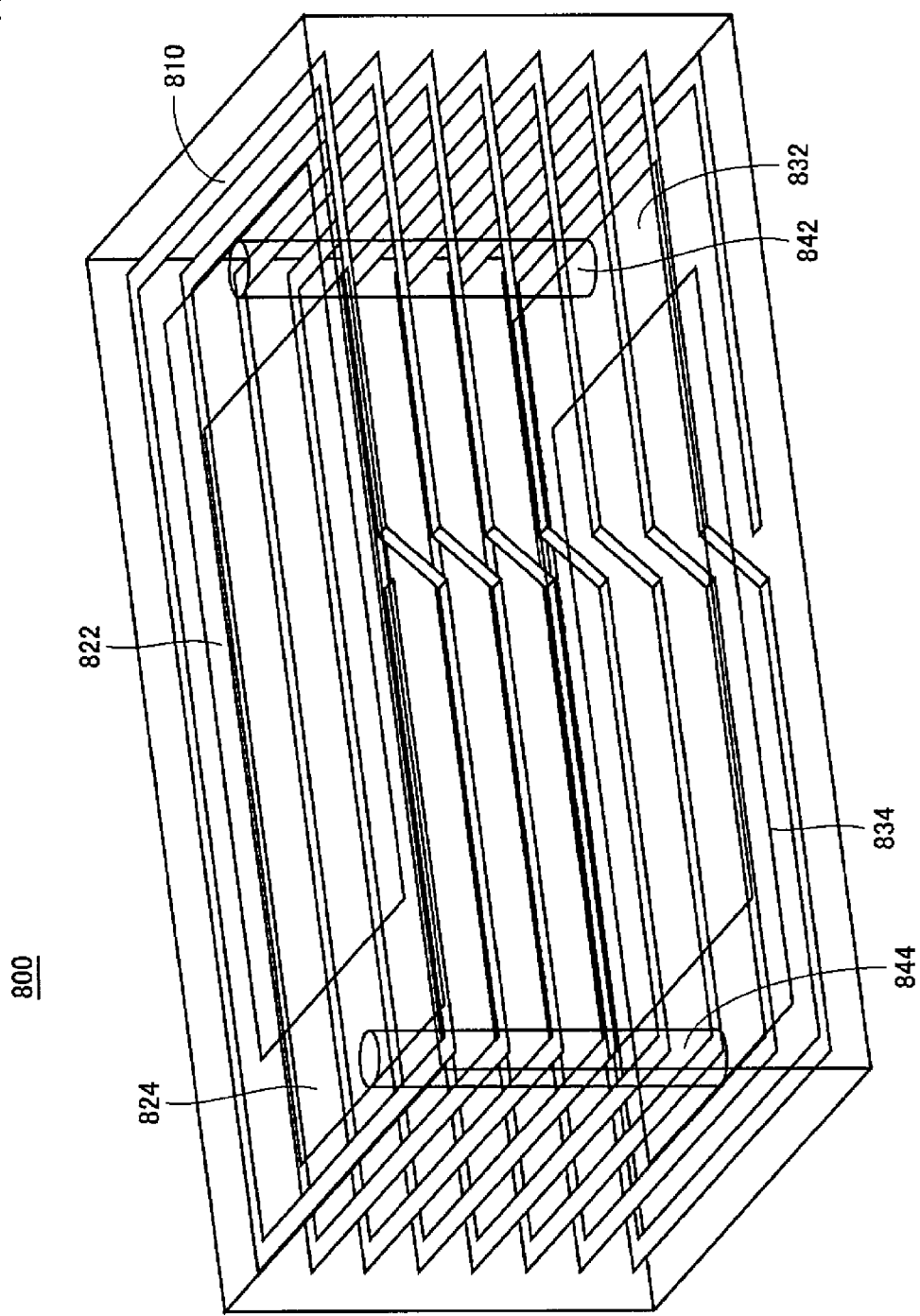
FIG. 24 is a perspective view of a unit included in a metamaterial according to a fourth embodiment.
Figure 25:
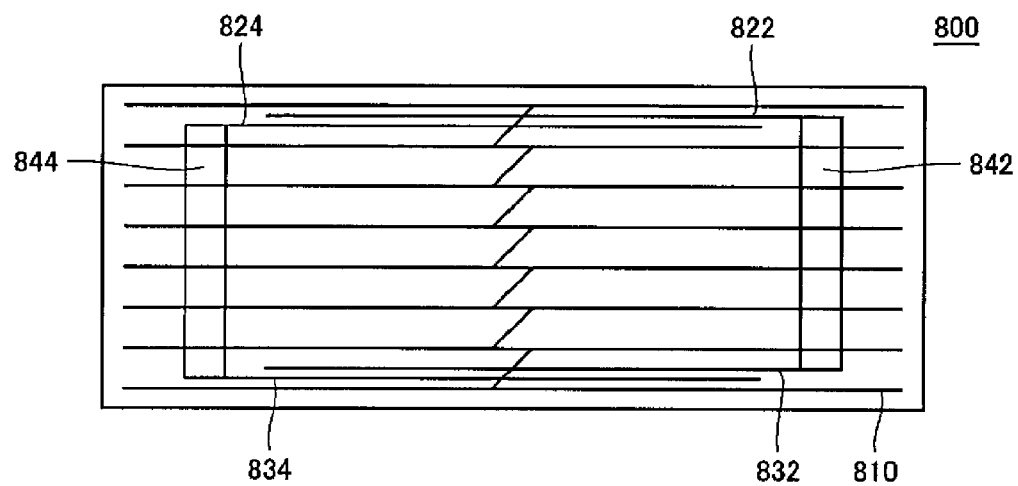
FIG. 25 is a side view of the unit included in the metamaterial according to the fourth embodiment.
Figure 26:
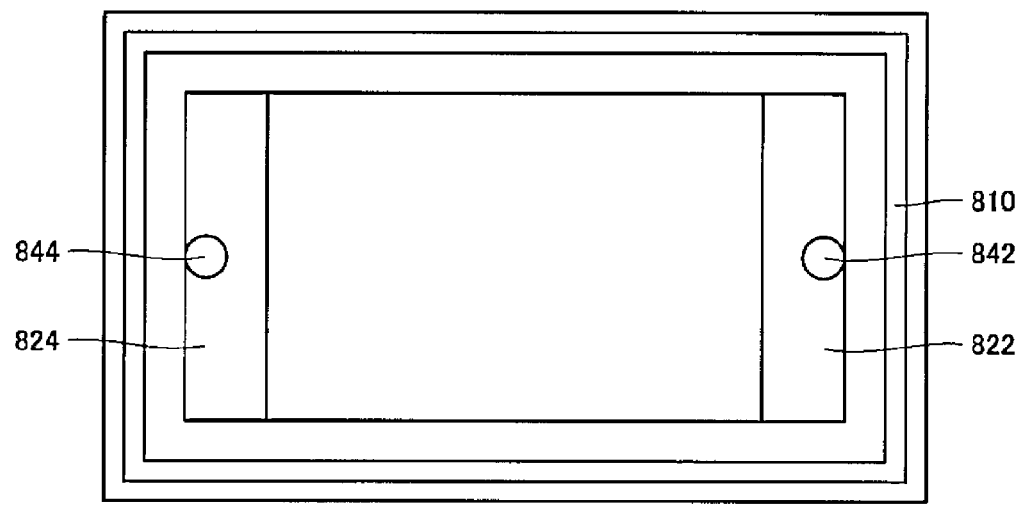
FIG. 26 is a top view of the unit included in the metamaterial according to the fourth embodiment.

The structure of a unit 800 included in a metamaterial according to the fourth embodiment will be described with reference to FIGS. 24 to 26. FIG. 24 is a perspective view of the unit 800. FIG. 25 is a side view of the unit 800. FIG. 26 is a top view of the unit 800.

The unit 800 includes a coiled conductor 810, a first electrode 822, a second electrode 824, a third electrode 832, a fourth electrode 834, a first via 842, and a second via 844.

The coiled conductor 810 wraps around a region of the unit 800 closer to the surface more than once (8 times in the example shown here). The coiled conductor 810 is placed to surround the first electrode 822, the second electrode 824, the third electrode 832, the fourth electrode 834, the first via 842, and the second via 844.

The first electrode 822 and the second electrode 824 are placed closely and opposed to each other. In addition, the first electrode 822 and the second electrode 824 are located to be deviated from each other in the horizontal plane.

The third electrode 832 and the fourth electrode 834 are placed closely and opposed to each other. In addition, the third electrode 832 and the fourth electrode 834 are located to be deviated from each other in the horizontal plane.

The pair of first electrode 822 and second electrode 824 is formed in an upper section in the unit 800. The pair of third electrode 832 and fourth electrode 834 is formed in a lower section in the unit 800. It is to be noted that the terms "upper section" and "lower section" used herein are related to the examples shown in FIGS. 24 and 25.

The first via 842 electrically connects the first electrode 822 to the third electrode 832. In addition, the second via 844 electrically connects the second electrode 824 to the fourth electrode 834.

In the structure described above, the first to fourth electrodes 822, 824, 832, 834, and the first and second vias 842, 844 function as a capacitive resonator to develop a negative magnetic permeability.

The configuration according to the present embodiment can increase the length of the line (coil) while keeping the size of the unit, as compared with the second and third embodiments. Therefore, a low resonant frequency can be obtained.

Fifth Embodiment

In the units (metamaterial units) included in the metamaterials according to the third and fourth embodiments described above, the resonator for a negative magnetic permeability has an external electrode for connecting internal electrodes. In contrast, in the case of a resonator for a negative magnetic permeability according to the present embodiment, a conductive section for connecting internal electrodes is achieved by a via.

Figure 27:
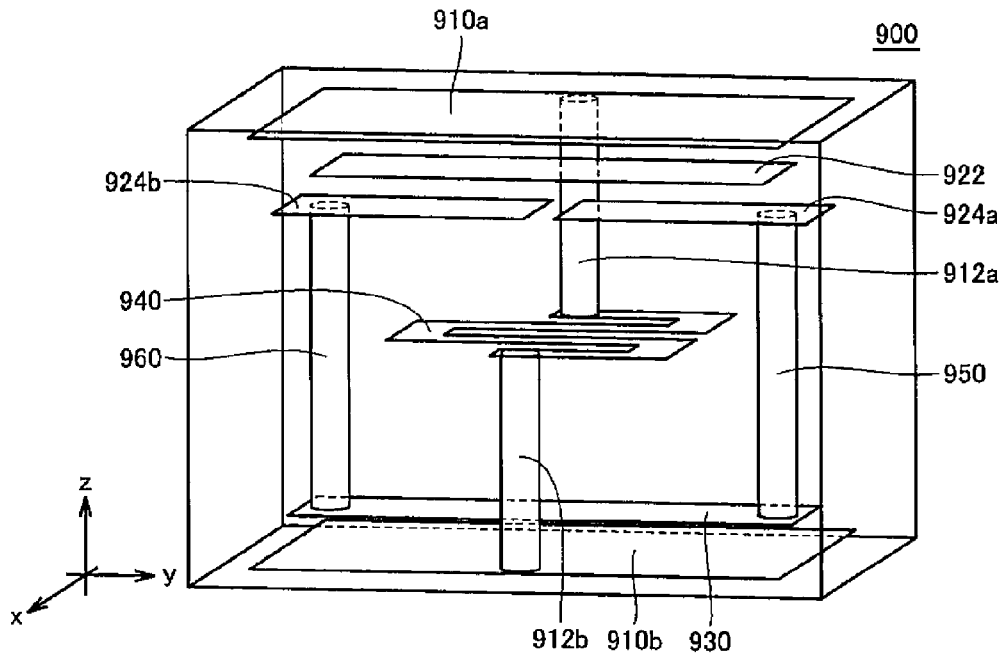
FIG. 27 is a perspective view of a unit included in a metamaterial according to a fifth embodiment.
Figure 28:
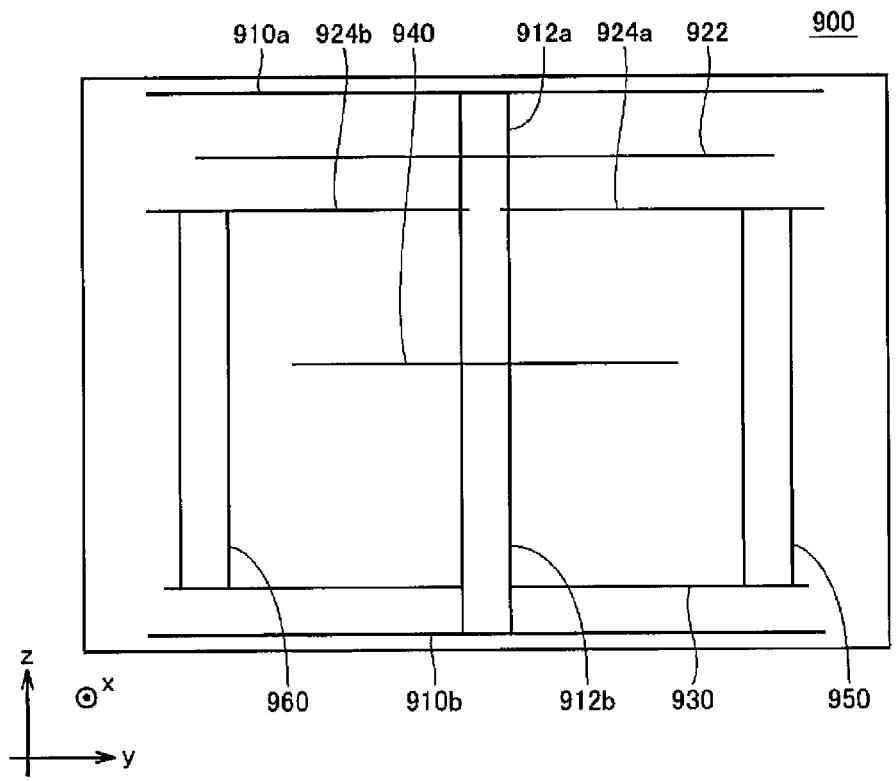
FIG. 28 is a front view of the unit included in the metamaterial according to the fifth embodiment.
Figure 29:
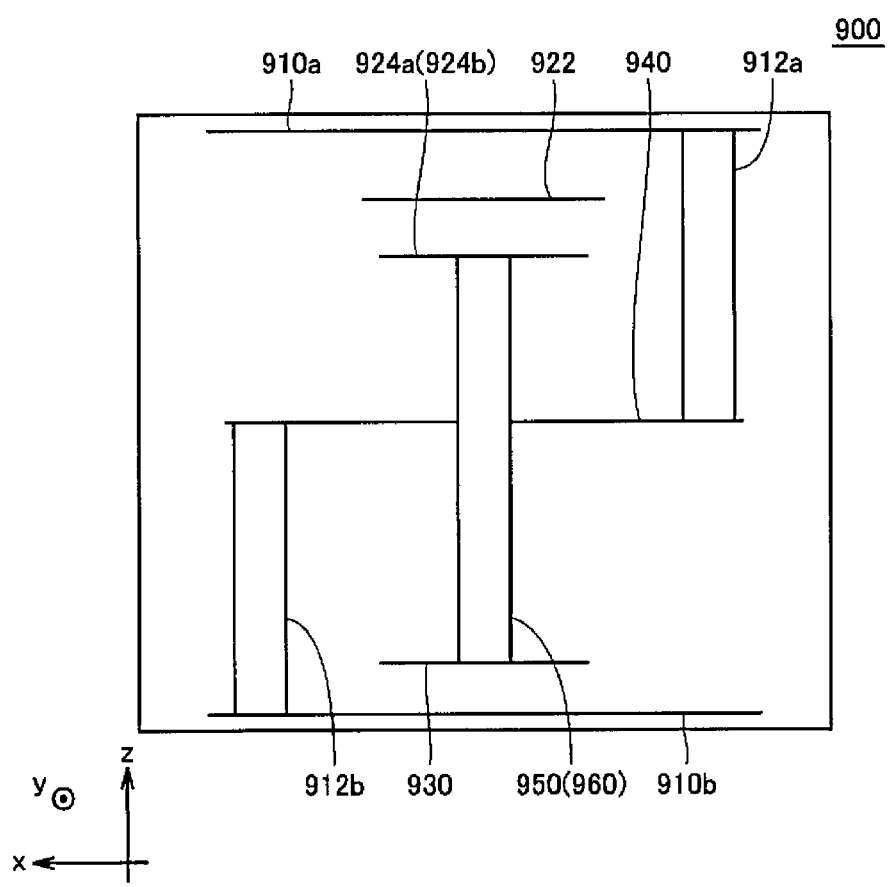
FIG. 29 is a side view of the unit included in the metamaterial according to the fifth embodiment.

The structure of one unit 900 of a metamaterial according to the fifth embodiment will be described with reference to FIGS. 27 to 29. FIG. 27 is a perspective view of the unit 900. FIG. 28 is a front view of the unit 900. FIG. 29 is a side view of the unit 900.

The unit 900 includes an uppermost part electrode 910a, a first via 912a, a second via 912b, a lowermost part electrode 910b, a first internal electrode 922, a second internal electrode 924a, a third internal electrode 924b, a fourth internal electrode 930, a line 940, a third via 950, and a fourth via 960.

The first via 912a, the line 940, and the second via 912b electrically connect the uppermost part electrode 910a to the lowermost part electrode 910b.

The total length of the first via 912a, line 940, and second via 912b is a length of substantially ½ the resonant wavelength. The first via 912a, line 940, and second via 912b function as a part of the λ/2 line to develop a negative dielectric constant. It is to be noted that the shape of the line 940 is not limited to the Meander line shown, and for example, a helical line and a spiral line may be employed.

The uppermost part electrode 910a and the lowermost part electrode 910b serve to increase the absolute value of a negative dielectric constant and shorten the resonant wavelength, as in the case of the uppermost part electrode 610a and lowermost part electrode 610b shown in FIG. 21. However, it is also possible to omit the uppermost part electrode 910a and the lowermost part electrode 910b.

It is to be noted that an external end of the first via 912a (an end which is not connected to the line 940) and an external end of the second via 912b (an end which is not connected to the line 940) are preferably located outside the resonator for a negative magnetic permeability so that electric charges are accumulated on the both ends of the λ/2 line, with or without the uppermost part electrode 910a and the lowermost part electrode 910b.

The third via 950 electrically connects the second internal electrode 924a to the fourth internal electrode 930. The fourth via 960 electrically connects the third internal electrode 924b to the fourth internal electrode 930. The second internal electrode 924a, the third via 950, the third internal electrode 924b, the fourth via 960, and the fourth internal electrode 930 have the same structure as a split ring resonator, and function as a resonator for developing a negative magnetic permeability. The first internal electrode 922 serves to compensate for a capacitance in a discontinuous section between the second internal electrode 924a and the third internal electrode 924b and thus decrease the resonant frequency, as in the case of the first internal electrode 722 in the fourth embodiment.

The unit 900 according to the present embodiment requires no external electrode. Therefore, this unit is easily manufactured. In the case of the creation of a unit including an external electrode, typically, the section other than the external electrode is formed by stacking, and the external electrode is attached to the part formed by stacking. In contrast, the unit 900 according to the present embodiment can be created by only the formation by stacking.

In addition, the unit 900 is preferable for the creation of a metamaterial including multiple units arranged. When units including external electrodes are brought into contact with each other, an electric current flowing through the external electrode of one unit will also flow through the external electrode of the other unit, resulting in a failure to give rise to a proper resonance of electromagnetic waves. Therefore, it has been necessary to process the units, such as placing the units spaced apart from each other, or covering the external electrodes with an insulator. The units 900 according to the present embodiment can be placed adjacent to each other, and the metamaterial can be thus further reduced in size. In addition, since it is not necessary to process the units, it is easy to create a metamaterial with the use of the units 900.

Figure 30:
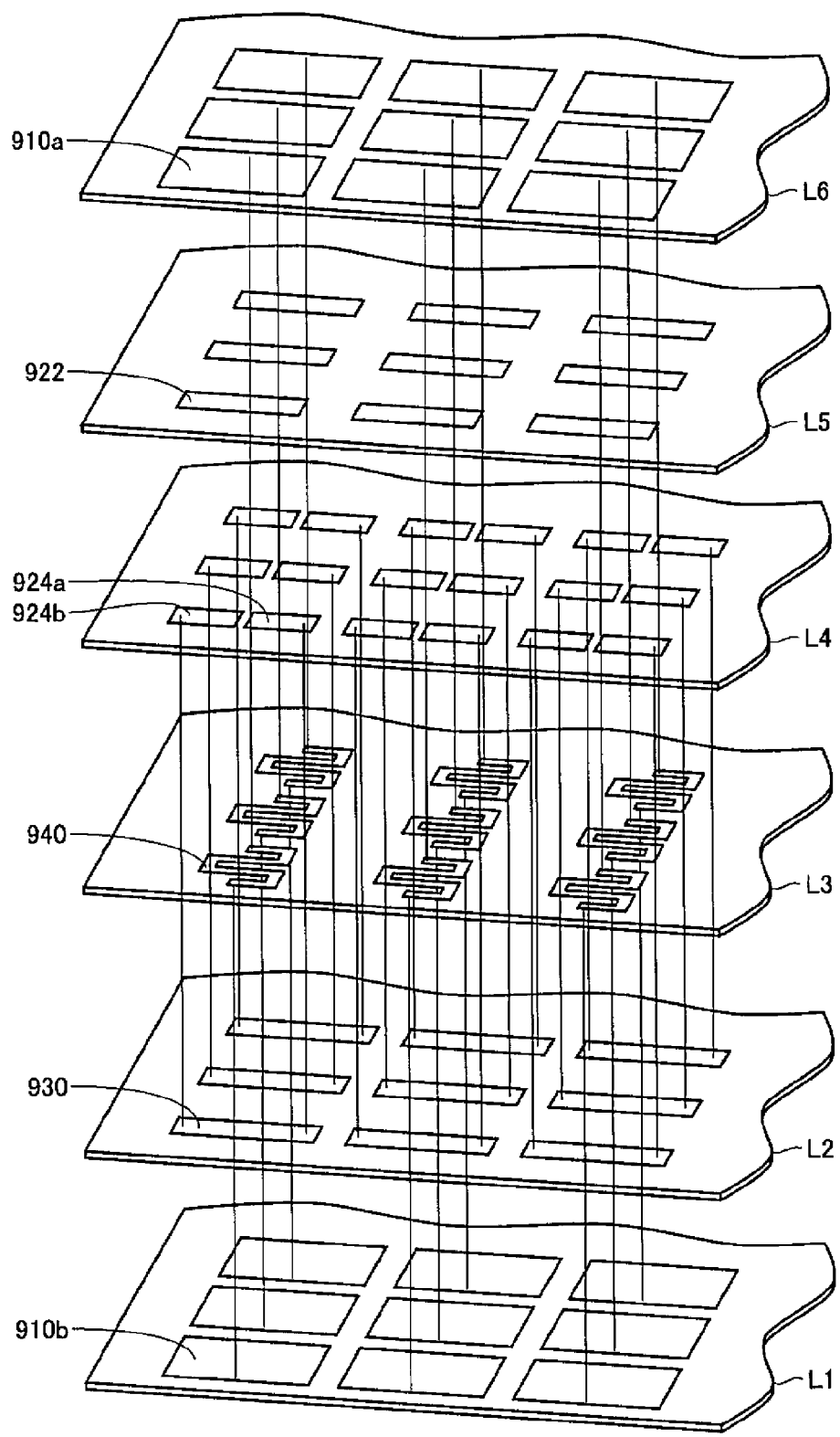
FIG. 30 is a diagram for explaining a method for creating the unit according to the fifth embodiment.

A method for creating the unit 900 will be described with reference to FIG. 30. FIG. 30 is a diagram for explaining a method for creating a unit 900 according to the sixth embodiment.

Referring to FIG. 30, the unit 900 is created by stacking multiple layers sequentially. FIG. 30 shows layers L1 to L6 including main components of the unit 900. The materials (substrate materials) of the respective layers are insulating materials such as resins. Metallic parts are formed on the substrate materials of some layers. In addition, the substrate materials of some layers have vias formed to penetrate through the substrate materials. It is to be noted that the layers L1 to L6 are partially shown in FIG. 30. Actually, the layers L1 to L6 further extend laterally in FIG. 30.

The layers L1 to L6 each have multiple (3×3 in FIG. 30) unit components periodically arranged. The layer L1 includes multiple lowermost part electrodes 910b. The layer L2 includes multiple fourth internal electrodes 930. The layer L3 includes multiple lines 940. The layer L4 includes multiple pairs of second internal electrodes 924a and third internal electrodes 924b. The layer L5 includes multiple first internal electrodes 922. The layer L6 includes multiple uppermost part electrodes 910a.

In addition, vias are formed in regions of the respective layers corresponding to the first via 912a, the second via 912b, the third via 950, and the fourth via 960. In FIG. 27, the vias are indicated by vertical thin lines.

After the respective layers are stacked to create a laminate, the laminate is cut to create units 900. The section shown in FIG. 30 can provide 9 units 900. It is to be noted that some units 900 may be collectively cut from the laminate, rather than separating the laminate into individual units 900.

It is to be noted that while the structure with the vias in place of the conductive sections of the split resonator described in the third embodiment has been described in the present embodiment, vias can be provided in place of conductive sections of the other types of resonators. For example, vias may be provided in place of the external electrodes of the multilayer capacitive resonator described in the second embodiment.

Sixth Embodiment

In the metamaterial units described above according to the second, third, and fifth embodiments, the line for developing a negative dielectric constant is formed in the LC resonator (specifically, the multilayer capacitive resonator and split resonator). However, the line may not be necessarily provided inside the LC resonator. In the sixth embodiment, a unit 1000 will be described in which a λ/2 line is placed outside an LC resonator.

Figure 31:
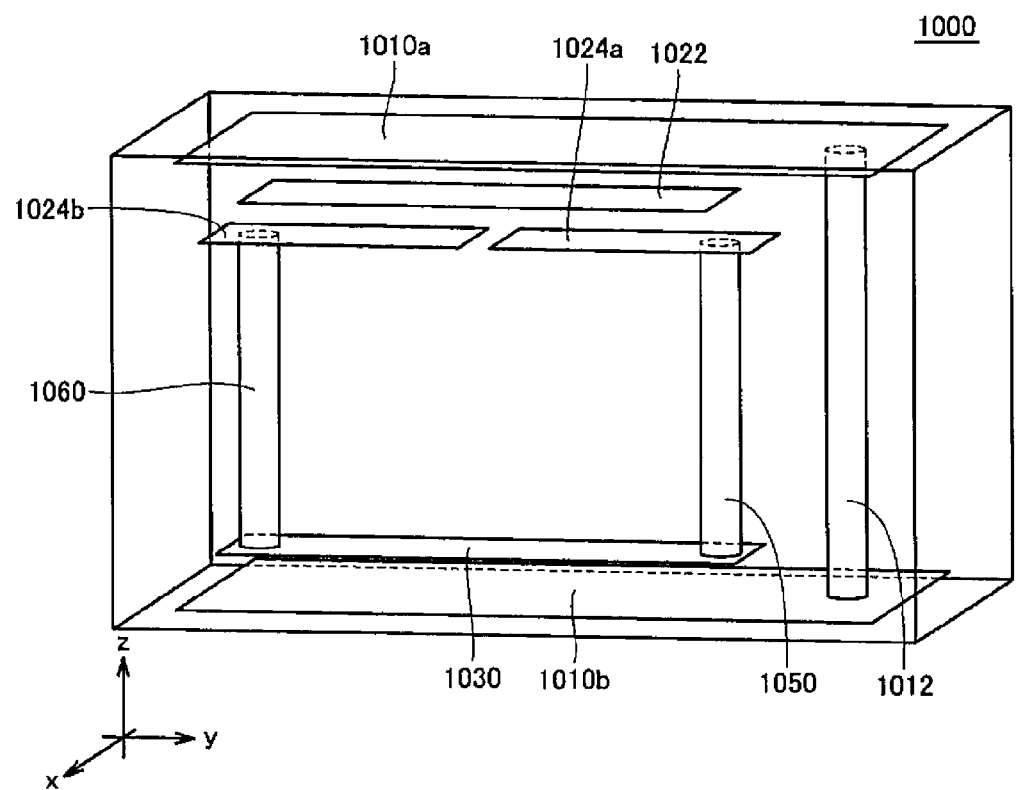
FIG. 31 is a diagram illustrating the structure of a unit according to a sixth embodiment.

The structure of a unit 1000 according to the sixth embodiment will be described with reference to FIG. 31. FIG. 31 is a diagram illustrating the structure of the unit 1000 according to the sixth embodiment.

Referring to FIG. 31, the unit 1000 includes an uppermost part electrode 1010a, a first via 1012, a lowermost part electrode 1010b, a first internal electrode 1022, a second internal electrode 1024a, a third internal electrode 1024b, a fourth internal electrode 1030, a second via 1050, and a third via 1060.

The first via 1012 electrically connects the uppermost part electrode 1010a to the lowermost part electrode 1010b. The length of the first via 1012 is substantially ½ of the resonant wavelength. Accordingly, the first via 1012 develops a negative dielectric constant with respect to electromagnetic waves of the resonant wavelength.

Further, in the present embodiment, the uppermost part electrode 1010a and the lowermost part electrode 1010b are connected by the linear first via 1012. However, as in the case of the structure shown in FIG. 27, multiple vias may be combined with a line in a horizontal plane to achieve a λ/2 line. For the reduction of the unit in size, the line in this case is preferably a bent line such as a Meander line, as described in the other embodiments.

The uppermost part electrode 1010a and the lowermost part electrode 1010b serve to increase the absolute value of a negative dielectric constant and shorten the resonant wavelength, as in the case of the uppermost part electrode 910a and lowermost part electrode 910b according to the fifth embodiment.

The second internal electrode 1024a, the first via 1050, the third internal electrode 1024b, the third internal electrode 1030, the second via 1060, and the third internal electrode 1024b have the same structure as a split ring resonator, and function as a resonator for developing a negative magnetic permeability. The first internal electrode 1022 serves to compensate for a capacitance in a discontinuous section between the second internal electrode 1024a and the third internal electrode 1024b and thus decrease the resonant frequency, as in the case of the first internal electrode 722 in the fourth embodiment.

The first internal electrode 1022, the second internal electrode 1024a, the first via 1050, the third internal electrode 1024b, the second via 1060, and the third internal electrode 1030 are placed in the space sandwiched between the uppermost part electrode 1010a and the lowermost part electrode 1010b. More specifically, in the case of the unit according to the present embodiment, a resonator for developing a negative magnetic permeability is formed in a resonator for developing a negative dielectric constant.

The unit 1000 according to the present embodiment has the internal electrodes electrically connected to each other through the vias as in the case of the unit 900 according to the fifth embodiment, and thus is easily created. In addition, the unit 1000 has no electrode at the surface of the unit, and thus is preferable for the creation of metamaterials.

Seventh Embodiment

In the metamaterial units according to the second to sixth embodiments, the electrodes for forming a capacitance are placed parallel to the xy plane in the LC resonators. In contrast, a metamaterial unit in which electrodes for forming a capacitance are placed parallel to the xz plane will be described in the seventh embodiment.

Figure 32:
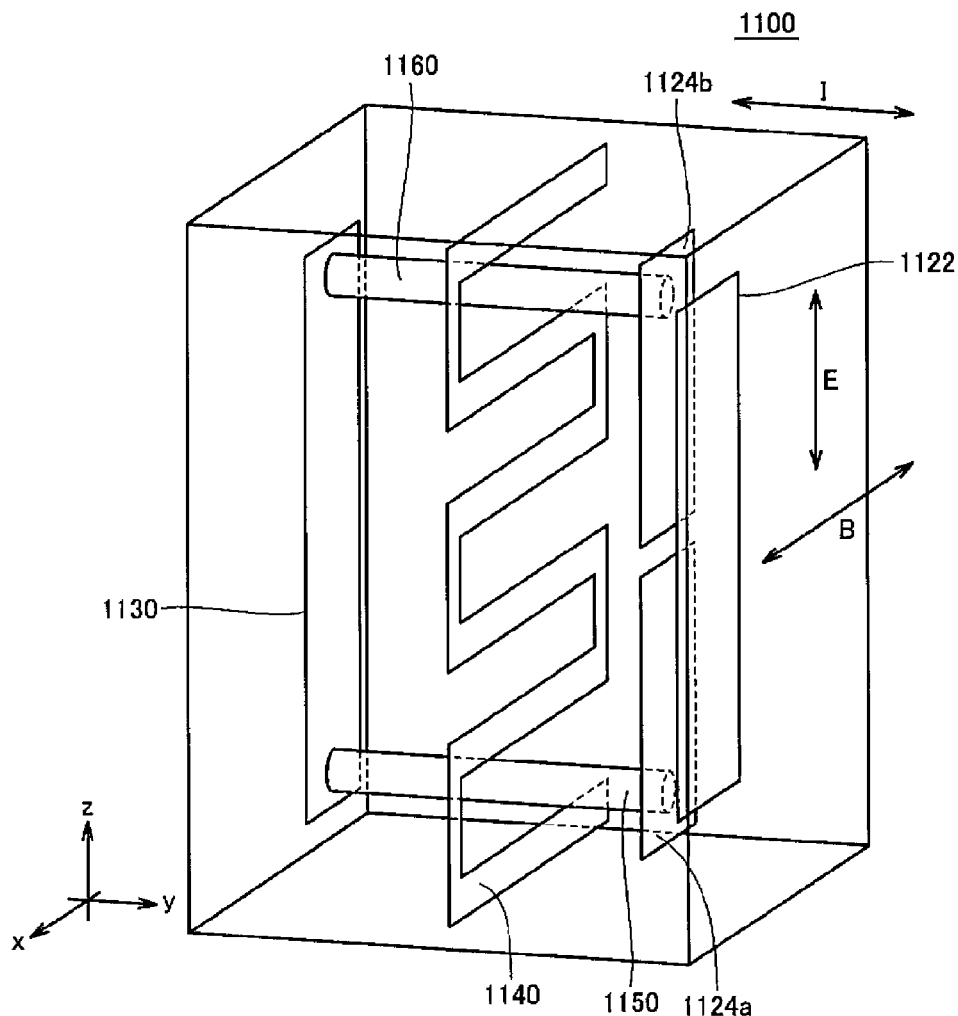
FIG. 32 is a diagram illustrating the structure of a unit according to a seventh embodiment.

The structure of a metamaterial unit 1100 according to the seventh embodiment will be described with reference to FIG. 32. FIG. 32 is a diagram illustrating the structure of the metamaterial unit 1100 according to the seventh embodiment. Reference symbols 1, E, and B respectively denote a current flow direction, an electric field direction, and a magnetic field direction.

Referring to FIG. 32, the unit 1100 includes a first internal electrode 1122, a second internal electrode 1124a, a third internal electrode 1124b, a fourth internal electrode 1130, a line 1140, a first via 1150, and a third via 1160.

The line 1140 is a Meander line which has a total length of substantially ½ the resonant wavelength. Therefore, the line 1140 develops a negative dielectric constant with respect to electromagnetic waves of the resonant wavelength. It is to be noted that the shape of the line 1140 is not limited to the shape shown in FIG. 32. For example, a helical line may be used instead of the line 1140. In addition, the line 1140 may be linear, depending on the required resonant wavelength or the size of the metamaterial.

The first internal electrode 1122, the second internal electrode 1124a, the first via 1150, the third internal electrode 1124b, the second via 1160, and the fourth internal electrode 1130 form an LC resonance loop as in the case of the resonators for a negative magnetic permeability according to the other embodiments.

However, unlike the other embodiments, the electrodes 1122, 1124a, 1124b, 1130 are all placed parallel to the xz plane. This is because the generated electric field reduces the effect on the LC resonance. In the electrode arrangement shown in FIG. 32, the electric field generated from the signal line and the electric field generated from the λ/2 line during the resonance of the dielectric constant both have a small effect on the LC resonance.

In contrast, for example, in the case of the unit 900 shown in FIG. 27, the resonance of the dielectric constant generates an electric field between the first outermost electrode 910a and the second outermost electrode 910b. This electric field produces a difference in electric potential between the first internal electrode 922 and the second internal electrode 924a (or the third internal electrode 924b) to affect the LC resonance. The electrode arrangement as in the case of the unit 1100 according to the present embodiment makes it easier to develop the resonance of the dielectric constant and the resonance of the magnetic permeability at the same time.

In addition, the LC resonance loop is placed in a region sandwiched between the both ends of the line 1140 in the present embodiment. More specifically, one end of the line 1140 is located on the signal line side (+z side) more than the loop, whereas the other end of the line 1140 is located on the ground side (−z side) more than the loop. These locations are achieved for preventing an electric field concentrated around the both ends of the line 1140 and a magnetic field concentrated in the loop due to the LC resonance from interfering with each other when the line 1140 gives rise to an antiresonance with respect to electromagnetic waves.

It is to be noted that no electrode plate is connected to either end of the line 1140 in the present embodiment. This configuration reduces the absolute value of a negative dielectric constant and requires a length close to $\lambda/2$, as compared with a case of connecting an electrode plate. The arrangement of the electrode plates according to the present embodiment is particularly effective in the case of connecting no electrode plate to the line as described above. This is because, in the presence of any electrode plate, the electrode plate makes the LC resonator less likely to be affected by the electric filed generated by the signal line, whereas in the absence of any electrode plate, the LC resonator is affected greatly by the electric filed generated by the signal line.

The unit 1100 according to the present embodiment has the internal electrodes connected by the vias, as in the case of the unit 900, etc., and can be thus created easily. It is to be noted that the unit 1100 is created most easily by stacking multiple layers parallel to the xz plane in FIG. 32.

CONCLUSION

The positional relationship between the resonators will be summarized in order for the metamaterial to develop a negative dielectric constant and a negative magnetic permeability at the same time at a resonant frequency. An explanation will be given with the use, as an example, of a metamaterial (or a metamaterial unit) including a combination of a split ring resonator and a half-wavelength resonator, as described in the fifth embodiment.

Figure 33:
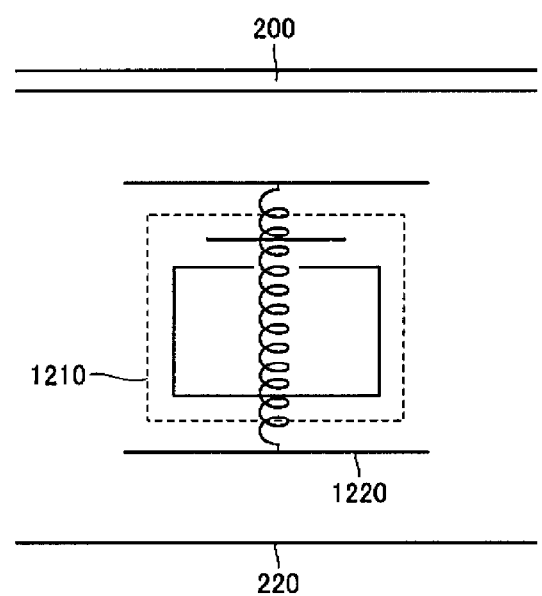
FIG. 33 is a diagram schematically illustrating the positional relationship among a metamaterial of a split ring resonator combined with a half-wavelength resonator, a signal line, and a ground.

FIG. 33 is a diagram schematically illustrating a positional relationship among a metamaterial including a combination of a split ring resonator 1210 and a half-wavelength resonator 1220, a signal line 200, and a ground 220. This metamaterial develops a negative magnetic permeability and a negative dielectric constant at the same time, as described in the fifth embodiment. This is because a region on which an electric field is concentrated will not overlap with a region on which a magnetic field is concentrated, when the metamaterial resonates with an electromagnetic field.

Figure 34:
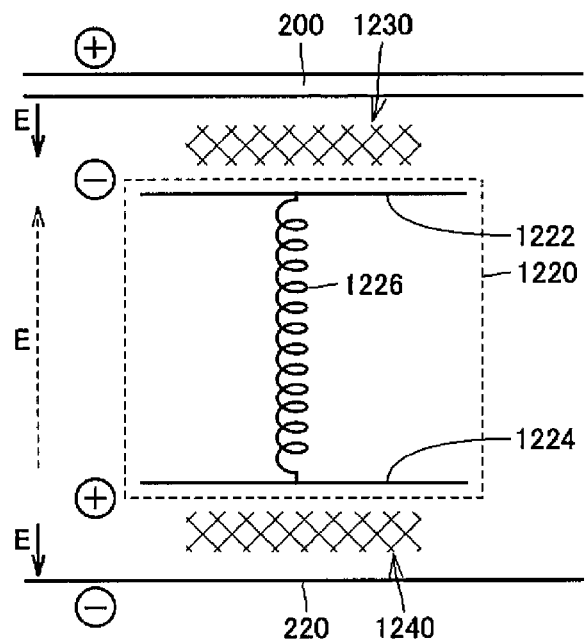
FIG. 34 is a diagram schematically illustrating electric charges and an electric field in the case of the metamaterial shown in FIG. 33 developing a negative dielectric constant.

The region on which the electric field is concentrated will be described with reference to FIG. 34. FIG. 34 is a diagram schematically illustrating electric charges and an electric field, in a case in which the metamaterial shown in FIG. 33 exhibits a negative dielectric constant. Referring to FIG. 34, the half-wavelength resonator 1220 includes a first outermost electrode 1222, a second outermost electrode 1224, and a line 1226. The first outermost electrode 1222 is placed on the signal line 200 side. The second outermost electrode 1224 is placed on the ground 220 side.

FIG. 34 shows a state in which an electric current flow through the signal line 200 to generate an electric field from the signal line 200 toward the ground 220. When the electric current flows with the resonant frequency, the first outermost electrode 1222 has negative charges accumulated, whereas the second outermost electrode 1224 has positive charges accumulated. Then, high electric fields are generated in a region 1230 between the first outermost electrode 1222 and the signal line 200 and a region 1240 between the second outermost electrode 1224 and the ground 220.

More specifically, the regions sandwiched between the ends of the half-wavelength resonator 1220 and the signal line 200 or the ground, on which electric charges are accumulated by the half-wavelength resonance, are the regions on which the electric field is concentrated by the resonance. It is to be noted that the electrodes connected to the both ends of the half-wavelength line correspond to the ends of the half-wavelength resonator 1220 in this case. However, when the half-wavelength resonator 1220 includes no electrode, the both ends of the half-wavelength line correspond to the ends of the half-wavelength resonator 1220.

Figure 35:
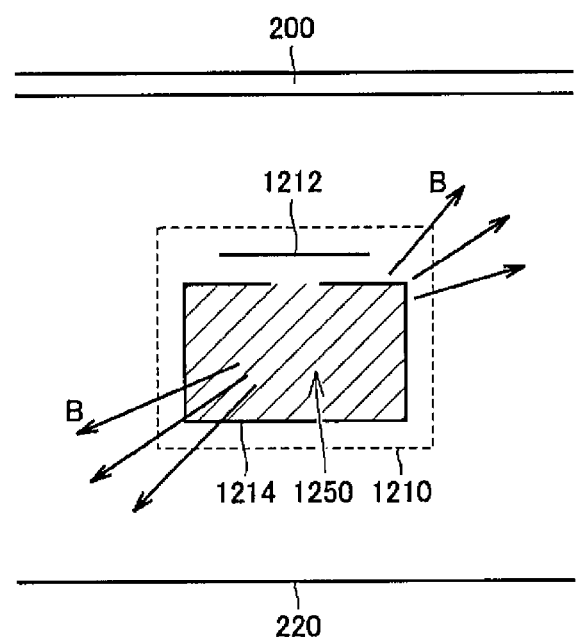
FIG. 35 is a diagram schematically illustrating a magnetic field in the case of the metamaterial shown in FIG. 33 developing a negative magnetic permeability.

The region on which the magnetic field is concentrated will be described with reference to FIG. 35. FIG. 35 is a diagram schematically illustrating a magnetic field in a case in which the metamaterial shown in FIG. 33 develops a negative magnetic permeability. Referring to FIG. 35, the split ring resonator 1210 includes a first conductor 1212 and a second conductor 1214.

FIG. 35 shows a state in which an electric current flows through the signal line 200 to generate a magnetic field from the split ring resonator 1210. When the electric current flows with the resonant frequency, the electric current gives rise to an LC resonance with the split ring resonator 1210 to generate, in a region 1250 inside the second conductor 1214, such a high magnetic field that cancels the magnetic field generated by the electric current flowing through the signal line 200. The generated magnetic field is mainly orthogonal to the plane of paper.

More specifically, the region inside the loop in which the LC resonance is generated is the region on which the magnetic field is concentrated by the resonance. In other words, the space surrounded by the pair of electrodes for forming a capacitance and the conductive sections for forming inductance is the region on which the magnetic field is concentrated by the resonance.

When FIG. 34 is compared with FIG. 35, the regions on which the electric field is concentrated (the region 1230 and the region 1240) and the region on which the magnetic field is concentrated (the region 1250) are spaced apart from each other. Therefore, the electric field generated by the resonance of the half-wavelength resonator 1220 has no substantial influence on the resonance of the split ring resonator 1210, and vice versa. Therefore, the metamaterial shown in FIG. 33 can develop a negative dielectric constant and a negative magnetic permeability at the same time. In the case of a metamaterial which has the structure shown in FIG. 33, a magnetic field generated by a magnetic permeability resonance is concentrated on a region which is different from a region on which an electric field generated by a dielectric constant resonance is concentrated.

For comparison, a metamaterial in a modified positional relationship between the split ring resonator and the half-wavelength resonator will be described with reference to FIGS. 36 to 38.

Figure 36:
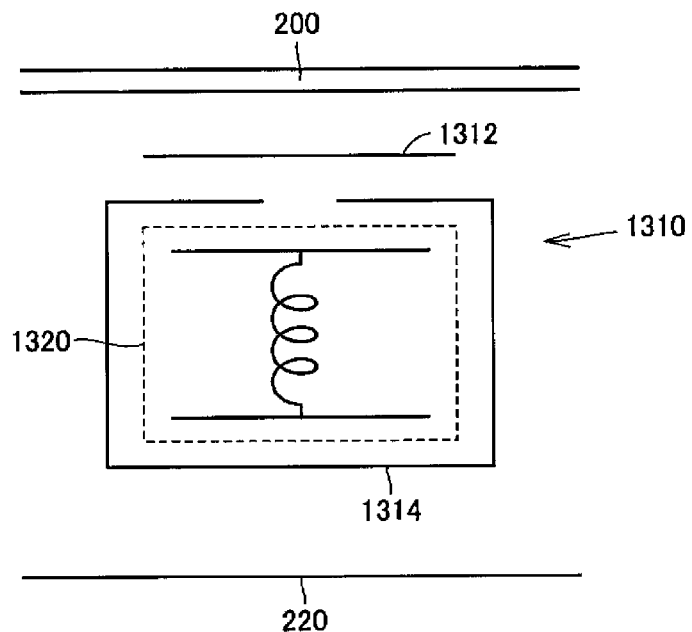
FIG. 36 is a diagram schematically illustrating the positional relationship among a metamaterial which differs from the metamaterial shown in FIG. 35 in the arrangement of resonators, a signal line, and a ground.

FIG. 36 is a diagram schematically illustrating the positional relationship among a metamaterial which is different from the metamaterial in FIG. 35 in the arrangement of resonators, a signal line 200, and a ground 220.

The metamaterial shown in FIG. 36 includes a split ring resonator 1310 and a half-wavelength resonator 1320. The split ring resonator 1310 includes a first conductor 1312 and the second conductor 1314. The half-wavelength resonator 1320 is generally placed in the second conductor 1314.

In the case of this metamaterial, a region on which en electric field is concentrated has an overlap with a region on which a magnetic field is concentrated, when the metamaterial resonates with an electromagnetic field. Therefore, it is somewhat difficult to develop a negative magnetic permeability and a negative dielectric constant stably at the same time.

Figure 37:
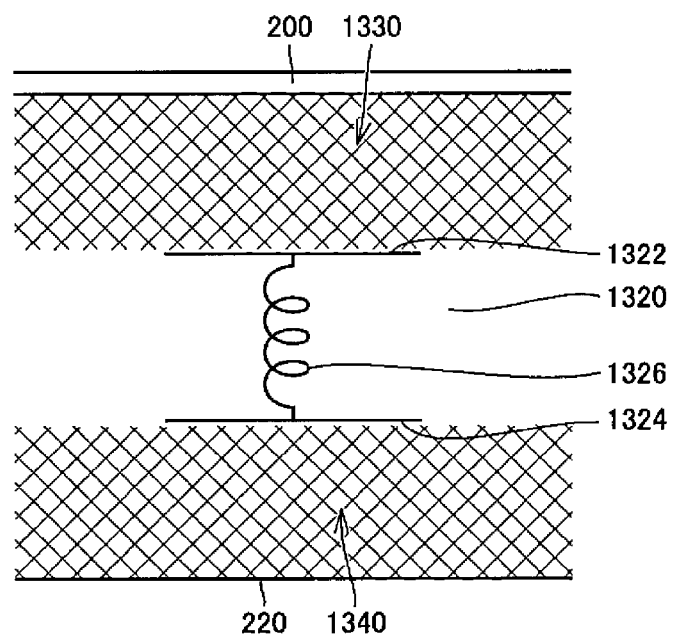
FIG. 37 is a diagram for explaining a region on which an electric field is concentrated when the metamaterial shown in FIG. 36 exhibits a negative dielectric constant.

The region on which the electric field is concentrated is shown in FIG. 37. FIG. 37 is a diagram for explaining regions on which the electric field is concentrated when the metamaterial shown in FIG. 36 exhibits a negative dielectric constant. Referring to FIG. 37, the half-wavelength resonator 1320 includes a first outermost electrode 1322, a second outermost electrode 1324, and a line 1326. The first outermost electrode 1322 is placed on the signal line 200 side. The second outermost electrode 1344 is placed on the ground 220 side.

When a negative dielectric constant is developed, high electric fields are generated in a region 1330 between the first outermost electrode 1322 and the signal line 200 and a region 1340 between the second outermost electrode 1324 and the ground 220.

The region on which the magnetic field is concentrated will be described with reference to FIG. 38. FIG. 38 is a diagram for explaining a region on which the magnetic field is concentrated when the metamaterial shown in FIG. 36 exhibits a negative magnetic permeability. When a negative magnetic constant is developed, such a high magnetic field that cancels the magnetic field generated by the electric current flowing through the signal line 200 is generated in a region 1350 inside a second conductor 1314.

Figure 38:
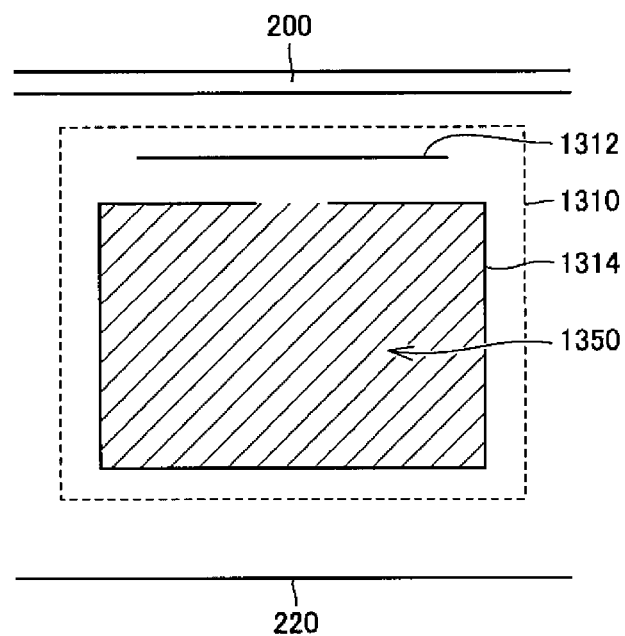
FIG. 38 is a diagram for explaining a region on which a magnetic field is concentrated when the metamaterial shown in FIG. 36 exhibits a negative magnetic permeability.

When FIG. 37 is compared with FIG. 38, the regions on which the electric field is concentrated (the region 1330 and the region 1340) have a partial overlap with the region on which the magnetic field is concentrated (the region 1350). Therefore, the electric field generated by the resonance of the half-wavelength resonator 1220 has an influence on the resonance of the split ring resonator 1210, and vice versa. Therefore, it is somewhat difficult for the metamaterial shown in FIG. 36 to develop a negative dielectric constant and a negative magnetic permeability at the same time.

It is to be noted that the same explanation applies to metamaterials including other types of resonators. The same explanation also applies to, for example, a metamaterial including a multilayer capacitive resonator in place of the split resonator.

However, in the case of using a multilayer capacitive resonator, electric charges of the same polarity preferably do not interfere with each other, as described in the first and second embodiments. More specifically, the resonators are preferably configured so that electric charges of the same polarity are generated apart from each other to such an extent that the developments of the electric charges have no influence on each other. Specifically, among multiple electrodes for forming a capacitance, the two outermost electrodes located outermost are preferably opposite in polarity.

The embodiments disclosed herein are to be considered exemplary in all respects, but not to be considered restrictive. The scope of the present invention is defined by the claims, not by the description above, and intended to encompass all modifications within the spirit and scope equivalent to the claims.

DESCRIPTION OF REFERENCE SYMBOLS 2 external electrode
3 external electrode
4 internal electrode
4a electrode
4b electrode
5 internal electrode
5a electrode
5b electrode
6 spacer
10 outer covering
100 coiled resonator
110 central axis
200 signal line
220 ground
300 capacitive resonator
600 unit
610a uppermost part electrode
610b lowermost part electrode
622, 624, 632, 634 internal electrode
640 line
650, 660 external electrode
700 unit
710a uppermost part electrode
710b lowermost part electrode
722, 724a, 724b, 730 internal electrode
740 line
750, 760 external electrode
800 unit
810 coiled conductor
822, 824, 832, 834 electrode
842, 844 via

The invention claimed is:

1. A metamaterial comprising:
a first resonator that exhibits a negative dielectric constant with respect to an electromagnetic wave of a resonant wavelength, the first resonator including a line having a length of substantially ½ the resonant wavelength;
a second resonator that exhibits a negative magnetic permeability with respect to the electromagnetic wave of the resonant wavelength; and
a supporting member that fixes positions of the first resonator and the second resonator so that a magnetic field generated by a resonance of the second resonator is concentrated on a first region which is different from a second region on which an electric field generated by a resonance of the first resonator is concentrated.

2. The metamaterial according to claim 1, wherein the supporting member fixes the positions of the first resonator and the second resonator so that ends of the line are located outside of an area defined by the second resonator.

3. The metamaterial according to claim 1, wherein the supporting member fixes the positions of the first resonator and the second resonator so that electric charges of the same polarity do not interfere with each other, the electric charges being generated by the respective resonances of each of the first resonator and the second resonator.

4. The metamaterial according to claim 1, wherein the supporting member fixes the first resonator and the second resonator between a signal line through which an electric current flows and a ground.

5. The metamaterial according to claim 4, wherein the supporting member fixes the first resonator so that a first distance of a first end of the line from the signal line is different from a second distance of a second end of the line from the signal line.

6. The metamaterial according to claim 4, wherein the second resonator includes an LC resonator, and
wherein the supporting member fixes the position of the LC resonator so that the magnetic field passes through a resonance loop of the LC resonator.

7. The metamaterial according to claim 4, wherein the supporting member fixes an end of the line at least one of between the second resonator and a plane including the signal line and between the second resonator and the ground.

8. The metamaterial according to claim 7,
wherein the second resonator comprises:
a first outermost electrode; and a second outermost electrode which is different in polarity from the first outermost electrode,
wherein the supporting member fixes a first end of the line between the first outermost electrode and a plane including the signal line, and
fixes a second end of the line between the second outermost electrode and the ground.

9. The metamaterial according to claim 4, wherein the supporting member fixes the first resonator so that electric potentials at first and second ends of the line are different from each other.

10. The metamaterial according to claim 4, wherein the supporting member fixes the position of the second resonator so that the second resonator magnetically couples with the magnetic field.

11. The metamaterial according to claim 4, wherein the second resonator comprises:
a first electrode; and
a second electrode opposed to the first electrode,
wherein the supporting member fixes the first electrode and the second electrode substantially parallel to a direction of the electric field.

12. A metamaterial comprising:
a first resonator that exhibits a negative dielectric constant with respect to an electromagnetic wave of a resonant wavelength, the first resonator including a line having a length of substantially ½ the resonant wavelength;
a second resonator that exhibits a negative magnetic permeability with respect to the electromagnetic wave of the resonant wavelength; and
a supporting member that fixes positions of the first resonator and the second resonator,
wherein the second resonator comprises:
a plurality of first plate-shaped electrodes;
a plurality of second plate-shaped electrodes respectively opposed to the plurality of first plate-shaped electrodes, the plurality of first plate-shaped electrodes and the plurality of second plate-shaped electrodes being arranged so that a first plate-shaped electrode of the plurality of first plate-shaped electrodes is a first outermost electrode of the second resonator, whereas a second plate-shaped electrode of the plurality of second plate-shaped electrodes is a second outermost electrode of the second resonator;
a first connection electrically connecting the plurality of first plate-shaped electrodes; and
a second connection electrically connecting the plurality of second plate-shaped electrodes,
wherein the supporting member fixes positions of the first resonator and the second resonator so that the first outermost electrode is proximal to a first end of the line and the second outermost electrode is proximal to a second end of the line.

13. The metamaterial according to claim 12, wherein the first resonator comprises:
a first conductive plate electrically connected to the first end of the line; and
a second conductive plate electrically connected to the second end of the line,
wherein the supporting member fixes the first conductive plate in a first position outside of an area defined by the second resonator and opposed to the first outermost electrode, and fixes the second conductive plate in a second position outside of the area defined by the second resonator and opposed to the second outermost electrode.

* * * * *